US012478603B2

(12) United States Patent
Puskarich et al.

(10) Patent No.: US 12,478,603 B2
(45) Date of Patent: Nov. 25, 2025

(54) SERUM METABOLITES AS BIOMARKERS FOR CARNITINE TREATMENT OF SEPSIS

(71) Applicants: The Regents of the University of Michigan, Ann Arbor, MI (US); The University of Mississippi Medical Center, Jackson, MS (US)

(72) Inventors: Michael A. Puskarich, Jackson, MS (US); Alan E. Jones, Jackson, MS (US); Christopher E. Gillies, Ann Arbor, MI (US); Theodore S. Jennaro, Ann Arbor, MI (US); Kathleen A. Stringer, Ann Arbor, MI (US)

(73) Assignees: The Regents of the University of Michigan, Ann Arbor, MI (US); The University of Mississippi Medical Center, Jackson, MS (US)

( * ) Notice: Subject to any disclaimer, the term of this patent is extended or adjusted under 35 U.S.C. 154(b) by 631 days.

(21) Appl. No.: 17/915,392

(22) PCT Filed: Mar. 30, 2021

(86) PCT No.: PCT/US2021/024998
§ 371 (c)(1),
(2) Date: Sep. 28, 2022

(87) PCT Pub. No.: WO2021/202608
PCT Pub. Date: Oct. 7, 2021

(65) Prior Publication Data
US 2023/0130325 A1    Apr. 27, 2023

Related U.S. Application Data

(60) Provisional application No. 63/107,174, filed on Oct. 29, 2020, provisional application No. 63/002,784, filed on Mar. 31, 2020.

(51) Int. Cl.
*A61K 31/205* (2006.01)
*G01N 33/68* (2006.01)

(52) U.S. Cl.
CPC ........... *A61K 31/205* (2013.01); *G01N 33/68* (2013.01); *G01N 2800/26* (2013.01); *G01N 2800/52* (2013.01)

(58) Field of Classification Search
CPC .................................................. A61K 31/205
See application file for complete search history.

(56) References Cited

U.S. PATENT DOCUMENTS

| | | | |
|---|---|---|---|
| 4,816,567 | A | 3/1989 | Cabilly et al. |
| 5,814,661 | A | 9/1998 | Ruggiero et al. |
| 10,330,685 | B2 | 6/2019 | Stringer et al. |
| 2008/0108548 | A1 | 5/2008 | Luyer et al. |
| 2009/0104596 | A1 | 4/2009 | Assadi-Porter et al. |
| 2009/0226530 | A1 | 9/2009 | Lassner et al. |
| 2012/0202240 | A1 | 8/2012 | Deigner et al. |
| 2013/0071866 | A1 | 3/2013 | Kido et al. |
| 2014/0107201 | A1 | 4/2014 | Williams et al. |
| 2017/0052192 | A1* | 2/2017 | Stringer ............... A61K 31/205 |
| 2019/0142853 | A1 | 5/2019 | Vasta et al. |
| 2019/0269695 | A1 | 9/2019 | Ren et al. |

FOREIGN PATENT DOCUMENTS

| | | |
|---|---|---|
| EP | 0566971 | 10/1993 |
| WO | WO 2015/168100 | 11/2015 |

OTHER PUBLICATIONS

Annane et al., Norepinephrine plus dobutamine versus epinephrine alone for management of septic shock: a randomised trial. Lancet. Aug. 25, 2007;370(9588):676-84.
Arnold et al., Multicenter study of early lactate clearance as a determinant of survival in patients with presumed sepsis. Shock. Jul. 2009;32(1):35-9.
Chung et al., Increased Plasma Acetylcarnitine in Sepsis Is Associated With Multiple Organ Dysfunction and Mortality: A Multicenter Cohort Study. Crit Care Med. Feb. 2019;47(2):210-218.
Clackson et al., Making antibody fragments using phage display libraries. Nature. Aug. 15, 1991;352(6336):624-8.
Cole et al., The EBV-Hybridoma technique and its application to human lung cancer in Monoclonal Antibodies and Cancer Therapy, Alan R. Liss, Inc., 1985, pp. 77-96.
Costa et al., Dynamic changes of plasma acylcarnitine levels induced by fasting and sunflower oil challenge test in children. Pediatr Res. Oct. 1999;46(4):440. 16 pages.
Dunn et al., Procedures for large-scale metabolic profiling of serum and plasma using gas chromatography and liquid chromatography coupled to mass spectrometry. Nat Protoc. Jun. 30, 2011;6(7):1060-83.
Eaton et al., Myocardial carnitine palmitoyltransferase I as a target for oxidative modification in inflammation and sepsis. Biochem Soc Trans. Dec. 2003;31(Pt 6):1133-6.
Evans et al., Untargeted Metabolomics Differentiates l-Carnitine Treated Septic Shock 1-Year Survivors and Nonsurvivors. J Proteome Res. May 3, 2019;18(5):2004-2011.
Fieser and Fieser's Reagents for Organic Synthesis, Wiley & Sons: New York, 1999, vols. 1-21. TOC only. 42 pages.
Fink. Bench-to-bedside review: Cytopathic hypoxia. Crit Care. Dec. 2002;6(6):491-9.
Fleischmann et al., Assessment of Global Incidence and Mortality of Hospital-treated Sepsis. Current Estimates and Limitations. Am J Respir Crit Care Med. Feb. 1, 2016;193(3):259-72.
Gaieski et al., Benchmarking the incidence and mortality of severe sepsis in the United States. Crit Care Med. May 2013;41(5):1167-74.

(Continued)

Primary Examiner — Paul V Ward
(74) Attorney, Agent, or Firm — Casimir Jones, S.C.; Thomas A. Isenbarger

(57) ABSTRACT

Provided herein is technology relating to treating septic shock and particularly, but not exclusively, to methods and systems for identifying sepsis patients most likely to benefit from L-carnitine treatment.

8 Claims, 13 Drawing Sheets

(56) References Cited

OTHER PUBLICATIONS

Gasparetto et al., Influence of acetyl-L-carnitine infusion on haemodynamic parameters and survival of circulatory-shock patients. Int J Clin Pharmacol Res. 1991;11(2):83-92.

Goeman et al., Multiple hypothesis testing in genomics. Stat Med. May 20, 2014;33(11):1946-78.

Harlow and Lane, Antibodies: A Laboratory Manual, Cold Spring Harbor Laboratory Press, Cold Spring Harbor, NY. 1988. TOC only. 9 pages.

Hatamkhani et al., Carnitine and sepsis: a review of an old clinical dilemma. J Pharm Pharm Sci. 2013;16(3):414-23.

Huse et al., Generation of a large combinatorial library of the immunoglobulin repertoire in phage lambda. Science. Dec. 8, 1989;246(4935):1275-81.

International Search Report and Written Opinion for PCT/US21/24998. Mailed Aug. 12, 2021. 12 pages.

Jansen et al., Early lactate-guided therapy in intensive care unit patients: a multicenter, open-label, randomized controlled trial. Am J Respir Crit Care Med. Sep. 15, 2010;182(6):752-61.

Johansson et al., Plasma mitochondrial DNA and metabolomic alterations in severe critical illness. Crit Care. Dec. 29, 2018;22(1):360.

Jones et al., Effect of Levocarnitine vs Placebo as an Adjunctive Treatment for Septic Shock: The Rapid Administration of Carnitine in Sepsis (RACE) Randomized Clinical Trial. JAMA Netw Open. Dec. 7, 2018;1(8):e186076. 1-12.

Katritzky et al., Comprehensive Heterocyclic Chemistry II, Pergamon, Oxford 1996, vol. 1-11. TOC only. 52 pages.

Katritzky et al., Comprehensive Heterocyclic Chemistry, Pergamon, Oxford 1984, vol. 1-9. TOC only. 30 pages.

Kozbor et al., The production of monoclonal antibodies from human lymphocytes. Immunol Today. Mar. 1983;4(3):72-9.

Labaki et al. Serum amino acid concentrations and clinical outcomes in smokers: Spiromics metabolomics study. Sci Rep. Aug. 6, 2019;9(1):11367.

Langley et al., An integrated clinico-metabolomic model improves prediction of death in sepsis. Sci Transl Med. Jul. 24, 2013;5(195):195ra95. 33 pages.

Langley et al., Integrative "omic" analysis of experimental bacteremia identifies a metabolic signature that distinguishes human sepsis from systemic inflammatory response syndromes. Am J Respir Crit Care Med. Aug. 15, 2014;190(4):445-55.

Larock, Comprehensive Organic Transformations, 2nd edition Wiley-VCH, New York 1999. TOC only. 17 pages.

Levy et al., Relation between muscle Na+K+ ATPase activity and raised lactate concentrations in septic shock: a prospective study. Lancet. Mar. 2005;365(9462):871-5.

Liu et al., Nuclear magnetic resonance-based serum metabolomic analysis reveals different disease evolution profiles between septic shock survivors and non-survivors. Crit Care. May 14, 2019;23(1):169. 12 pages.

Marks et al., By-passing immunization. Human antibodies from V-gene libraries displayed on phage. J Mol Biol. Dec. 5, 1991;222(3):581-97.

Martin et al., The effect of age on the development and outcome of adult sepsis. Crit Care Med. Jan. 2006;34(1):15-21.

McCafferty et al., Phage antibodies: filamentous phage displaying antibody variable domains. Nature. Dec. 6, 1990;348(6301):552-4.

McHugh et al., Rapid, Reproducible, Quantifiable NMR Metabolomics: Methanol and Methanol: Chloroform Precipitation for Removal of Macromolecules in Serum and Whole Blood. Metabolites. Dec. 14, 2018;8(4):93. 15 pages.

Mickiewicz et al., Metabolic profiling of serum samples by 1H nuclear magnetic resonance spectroscopy as a potential diagnostic approach for septic shock. Crit Care Med. May 2014;42(5):1140-9.

Muoio et al., Muscle-specific deletion of carnitine acetyltransferase compromises glucose tolerance and metabolic flexibility. Cell Metab. May 2, 2012;15(5):764-77.

Nanni et al., Plasma carnitine levels and urinary carnitine excretion during sepsis. JPEN J Parenter Enteral Nutr. Jul.-Aug. 1985;9(4):483-90.

Orlandi et al., Cloning immunoglobulin variable domains for expression by the polymerase chain reaction. Proc Natl Acad Sci U S A. May 1989;86(10):3833-7.

Puskarich et al., Lactate Clearance in Septic Shock Is Not a Surrogate for Improved Microcirculatory Flow. Acad Emerg Med. Jun. 2016;23(6):690-3.

Puskarich et al., Pharmacometabolomics of l-carnitine treatment response phenotypes in patients with septic shock. Ann Am Thorac Soc. Jan. 2015;12(1):46-56.

Puskarich et al., Preliminary safety and efficacy of L-carnitine infusion for the treatment of vasopressor-dependent septic shock: a randomized control trial. JPEN J Parenter Enteral Nutr. Aug. 2014;38(6):736-43.

Puskarich et al., Septic Shock Nonsurvivors Have Persistently Elevated Acylcarnitines Following Carnitine Supplementation. Shock. Apr. 2018;49(4):412-419.

Remington's Pharmaceutical Sciences, 18th edition, edited by A. R. Gennaro, Mack Publishing Co., 1990. TOC only. 9 pages.

Remingtons Pharmaceutical Sciences, Mack Publishing Co. (A. R. Gennaro edit. 1985), TOC only. 4 pages.

Rudd et al., Global, regional, and national sepsis incidence and mortality, 1990-2017: analysis for the Global Burden of Disease Study. Lancet. Jan. 18, 2020;395(10219):200-211.

Sastry et al., Cloning of the immunological repertoire in *Escherichia coli* for generation of monoclonal catalytic antibodies: construction of a heavy chain variable region-specific cDNA library. Proc Natl Acad Sci USA. Aug. 1989;86(15):5728-32.

Sawhney et al., Bioerodible Hydrogels Based on Photopolymer-ized Poly(ethyleneglycol)-co-poly(a-hydroxy acid) Diacrylate Macromers. Macromolecules, 1993, 26 (4), pp. 581-587.

Schroeder et al., The cycling of acetyl-coenzyme A through acetylcarnitine buffers cardiac substrate supply: a hyperpolarized 13C magnetic resonance study. Circ Cardiovasc Imaging. Mar. 2012;5(2):201-9.

Seymour et al., Derivation, Validation, and Potential Treatment Implications of Novel Clinical Phenotypes for Sepsis. JAMA. May 28, 2019;321(20):2003-2017.

Singer et al., The Third International Consensus Definitions for Sepsis and Septic Shock (Sepsis-3). JAMA. Feb. 23, 2016;315(8):801-10.

Storey. A direct approach to false discovery rates. J Roy Stat Soc B 2002; 64: 479-498.

Stringer et al., L-Carnitine Treatment Impacts amino Acid and Energy Metabolism in Sepsis as Detected by Untargeted 1H-Nuclear Magnetic Resonance (NMR) Pharmacometabolomics. Symposium, 8:30 am, 2012, Publication A3932. 2 pages.

Stringer et al., Whole Blood Reveals More Metabolic Detail of the Human Metabolome than Serum as Measured by 1H-NMR Spectroscopy: Implications for Sepsis Metabolomics. Shock. Sep. 2015;44(3):200-8.

Thonusin et al., Evaluation of intensity drift correction strategies using MetaboDrift, a normalization tool for multi-batch metabolomics data. J Chromatogr A. Nov. 10, 2017:1523:265-274.

Trost et al., Comprehensive Organic Synthesis, Pergamon, Oxford, 1991. TOC only. 4 pages.

Vary. Sepsis-induced alterations in pyruvate dehydrogenase complex activity in rat skeletal muscle: effects on plasma lactate. Shock. Aug. 1996;6(2):89-94.

Vincent et al., Clinical trial design for unmet clinical needs: a spotlight on sepsis. Expert Rev Clin Pharmacol. Sep. 2019;12(9):893-900.

Vincent et al., Use of the SOFA score to assess the incidence of organ dysfunction/failure in intensive care units: results of a multicenter, prospective study. Working group on "sepsis-related problems" of the European Society of Intensive Care Medicine. Crit Care Med. Nov. 1998;26(11):1793-800.

\* cited by examiner

SERUM METABOLITES AS BIOMARKERS FOR CARNITINE TREATMENT OF SEPSIS

This application is a national phase application under 35 U.S.C. § 371 of PCT International Application No.: PCT/US2021/024998, filed on Mar. 30, 2021, which claims priority to U.S. provisional patent application Ser. No. 63/002,784, filed Mar. 31, 2020, and U.S. provisional patent application Ser. No. 63/107,174, filed Oct. 29, 2020, each of which is incorporated herein by reference in its entirety.

STATEMENT REGARDING FEDERALLY SPONSORED RESEARCH OR DEVELOPMENT

This invention was made with government support under GM103799, GM113041, and GM111400 awarded by the National Institutes of Health. The government has certain rights in the invention.

FIELD

Provided herein is technology relating to treating septic shock and particularly, but not exclusively, to methods and systems for identifying sepsis patients most likely to benefit from L-carnitine treatment.

BACKGROUND

Sepsis represents the leading cause of death in the intensive care unit and the single most expensive inpatient diagnosis, representing more than $17 billion in healthcare costs annually in the United States (1-3). Septic shock carries a particularly poor prognosis, with short-term mortality rates of approximately 40%. Among the many physiologic disturbances associated with sepsis is a profound shift in metabolism (4). For instance, hyperlactatemia is a criterion for the diagnosis of septic shock (5) and hyperglycemia, lipolysis, and protein catabolism are also common and similarly associated with increased mortality (4, 6). Manipulation of these processes represents an underdeveloped but promising target for novel pharmacotherapies.

Despite the concerning sepsis mortality statistics and an increasingly focused research effort on the condition, sepsis pharmacotherapies have yielded disappointing results. While the failure to identify successful treatments is multifactorial, the highly heterogeneous nature of sepsis contributes to the difficulty in developing treatments (7). Accordingly, treatment of sepsis would be improved by methods for enriched patient selection, e.g., for identifying patients for treatment and/or for enrollment in clinical trials to minimize heterogeneity and more effectively test therapeutic candidates.

SUMMARY

Accordingly, provided herein is a technology related to identifying sepsis patients that are more likely to respond to treatment with L-carnitine (e.g., intravenous administration of L-carnitine). In particular, embodiments of the technology provide methods and systems for identifying (e.g., differentiating) patients that disproportionately benefit from L-carnitine treatment (e.g., as measured by mortality) by measuring serum concentrations of acylcarnitines and/or other metabolites.

While treating patients with L-carnitine has shown promise in the treatment of septic shock, a recent clinical trial demonstrated a non-significant reduction in mortality. In particular, a phase II, Bayesian adaptive dose-finding randomized control trial compared L-carnitine (6, 12, or 18 g) treatment to saline treatment (placebo) for the early treatment of septic shock (8). Data collected from the clinical trial indicated that none of the tested L-carnitine doses produced a significant reduction in sequential organ failure assessment (SOFA) score at 48 hours, though the highest and best performing dose (18 g) demonstrated a non-significant 3% and 6% absolute mortality reduction at 28 days in the intention to treat and per protocol analyses compared to saline placebo, respectively.

A part of the original trial included an ancillary metabolomics approach to identify the impact of L-carnitine on the sepsis metabolome and to identify candidate drug response metabolites that provide inclusion criteria for a phase III trial. A number of studies have demonstrated the importance of energy-related metabolites for the differentiation of sepsis survivors and the identification of sepsis phenotypes (4, 6, 9-12), most of which are readily detected by nuclear magnetic resonance (NMR) spectroscopy (6, 10, 11) and targeted liquid chromatography-mass spectroscopy (LC-MS) assays (12). Furthermore, previously collected data demonstrated the utility of metabolomics in predicting drug response (pharmacometabolomics) in sepsis (11).

Accordingly, the technology provided herein relates to a method of treating a subject for sepsis. For example, in some embodiments, methods comprise measuring an acylcarnitine level in a biological sample from a subject that is greater than or equal to a threshold level; and administering carnitine to said subject. In some embodiments, the acylcarnitine is acetylcarnitine. In some embodiments, the biological sample is or comprises a serum sample. In some embodiments, the threshold level is 36 µM. In some embodiments, the threshold level is 26 µM. In some embodiments, the carnitine is administered in a dose of 18 g. In some embodiments, methods comprise testing said subject for a symptom of sepsis. In some embodiments, the subject has a decreased 90-day mortality after treatment with carnitine. In some embodiments, the acylcarnitine is C12-carnitine, C8:1-carnitine, C10:1-carnitine, or C5-carnitine. In some embodiments, two or more (e.g., two, three, four, or five) of C12-carnitine, C8:1-carnitine, C10:1-carnitine, C5-carnitine, and/or acetylcarnitine is/are measured. In some embodiments, the acylcarnitine is C12-carnitine and said threshold is 0.18 µM; said acylcarnitine is C8:1-carnitine and said threshold is 0.84 µM; said acylcarnitine is C10:1-carnitine and said threshold is 0.60 µM; and/or said acylcarnitine is C5-carnitine and said threshold is 0.30 µM. In some embodiments, methods further comprise measuring a second acylcarnitine level in a biological sample from a subject after said administering carnitine to said subject. In some embodiments, methods further comprise administering carnitine to said subject after measuring said second acylcarnitine level.

In some embodiments, the technology provides a method for treating a subject for sepsis. For example, in some embodiments, methods comprise administering carnitine to the subject, wherein a biological sample from the subject comprises a level of an acylcarnitine that is greater than or equal to a threshold level. In some embodiments, the acylcarnitine is acetylcarnitine. In some embodiments, the biological sample is or comprises a serum sample. In some embodiments, the threshold level is 36 µM. In some embodiments, the threshold level is 26 µM. In some embodiments, the carnitine is administered in a dose of 18 g. In some embodiments, methods comprise testing the subject for a symptom of sepsis. In some embodiments, the subject has a decreased 90-day mortality after treatment with carnitine. In some embodiments, the acylcarnitine is C12-carnitine, C8:1-carnitine, C10:1-carnitine, or C5-carnitine. In some embodiments, two or more (e.g., two, three, four, or five) of C12-carnitine, C8:1-carnitine, C10:1-carnitine, C5-carnitine, and/or acetylcarnitine is/are measured. In some embodiments, the acylcarnitine is C12-carnitine and the threshold is 0.18 µM; the acylcarnitine is C8:1-carnitine and the threshold is 0.84 µM; the acylcarnitine is C10:1-carnitine and the threshold is 0.60 µM; and/or the acylcarnitine is C5-carnitine and the threshold is 0.30 µM. In some embodiments, methods further comprise measuring a second acylcarnitine level in a biological sample from a subject after the administering carnitine to the subject. In some embodiments, methods further comprise administering carnitine to the subject after measuring the second acylcarnitine level.

In some embodiments, the technology relates to use of carnitine to treat a subject for sepsis, wherein a biological sample from the subject comprises acylcarnitine at a level that is greater than or equal to a threshold level. In some embodiments, the biological sample comprises serum. In some embodiments, the acylcarnitine is acetylcarnitine. In some embodiments, the threshold level is 36 µM. In some embodiments, the threshold level is 26 µM.

Additional embodiments will be apparent to persons skilled in the relevant art based on the teachings contained herein.

BRIEF DESCRIPTION OF THE DRAWINGS

In FIGS. 1A, 1B, 1C, and 1D, the violin plots show the median and 25th and 75th percentiles of the normalized values of metabolite concentrations. Comparisons between 90-day survivors (white) and non-survivors (grey) for placebo-treated and each dose of carnitine-treated subjects were performed using an unpaired Student's t-test with Welch correction when applicable. P values were corrected for multiple comparisons using the false discovery rate (FDR) method of Storey, et al. (30). Data represent placebo survivors (n=32-34) and non-survivors (n=37); 6-g carnitine dose survivors (n=10-11) and non-survivors (n=23-24); 12-g carnitine dose survivors (n=14) and non-survivors (n=15-17); and 18-g carnitine dose survivors (n=50-53) and non-survivors (n=46-47); FDR corrected p values, *q≤0.05; **q≤0.01.

FIG. 3, scenario 2, an acetylcarnitine (C2) threshold concentration of ≥26 µM is used. Thirty-five percent (n=83) of the RACE cohort met this criterion and of these, 52 patients received either L-carnitine (18 g) or placebo. The hazard ratio is improved but is not significant, and the Kaplan-Meier curve shows no mortality benefit of L-carnitine (p=0.14). Also see Table 6.

FIG. 3, scenario 3, an acetylcarnitine (C2) threshold concentration of ≥30 µM is used. Twenty-six percent (n=61) of the RACE cohort met this criterion and of these, 42 patients received either L-carnitine (18 g) or placebo. The hazard ratio is significant and favors L-carnitine (18 g); the Kaplan-Meier curve shows a mortality benefit of L-carnitine (p=0.01). Also see Table 6.

FIG. 3, scenario 4, uses the acetylcarnitine (C2) concentration associated with the maximum Z-statistic (see Table 6), ≥36 µM. Twenty-one percent (n=50) of the RACE cohort met this criterion and of these, 34 patients received either L-carnitine (18 g) or placebo. The hazard ratio is significant, and the Kaplan-Meier curve shows a mortality benefit of L-carnitine (p=0.004).

Figure 1A:
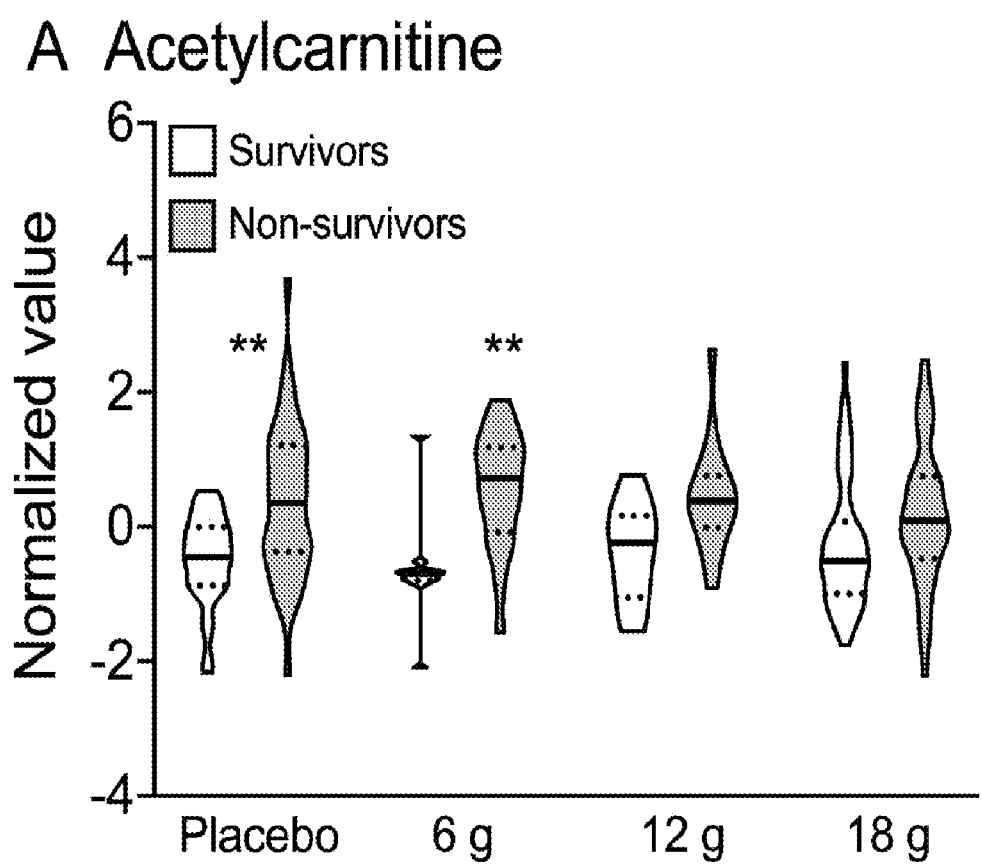
FIG. 1A is a violin plot showing differences in pre-treatment acetylcarnitine stratified by treatment arm.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Sepsis is a highly heterogeneous illness that remains a significant threat to human health for which no targeted therapeutics have been identified. During experiments conducted during the development of embodiments of the technology provided herein, metabolomics data generated from a clinical trial of L-carnitine for the treatment of septic shock indicated that pre-treatment concentration of acylcarnitine (e.g., acetylcarnitine) identifies patients that derive a mortality benefit from treatment L-carnitine. Accordingly, the technology provided herein relates to using serum concentrations of acylcarnitines to discriminate sepsis phenotypes and identify patients to treat with L-carnitine for septic shock.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present or "absent") is used in a relative sense to describe the amount or level of a particular entity (e.g., an analyte). For example, when an analyte is said to be "present" in a test sample, it means the level or amount of this analyte is above a pre-determined threshold; conversely, when an analyte is said to be "absent" in a test sample, it means the level or amount of this analyte is below a pre-determined threshold. The pre-determined threshold may be the threshold for detectability associated with the particular test used to detect the analyte or any other threshold. When an analyte is "detected" in a sample it is "present" in the sample; when an analyte is "not detected" it is "absent" from the sample. Further, a sample in which an analyte is "detected" or in which the analyte is "present" is a sample that is "positive" for the analyte. A sample in which an analyte is "not detected" or in which the analyte is "absent" is a sample that is "negative" for the analyte.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "treatment" is defined as the application or administration of a therapeutic agent described herein (e.g., L-carnitine) to a patient, or application or administration of the therapeutic agent to an isolated tissue or cell line from a patient, who has a disease (e.g., sepsis), a symptom of disease, or a predisposition toward a disease, with the purpose to cure, heal, alleviate, relieve, alter, remedy, ameliorate, improve, or affect the disease, the symptoms of disease, or the predisposition toward disease.

Compositions according to the technology can be administered in the form of pharmaceutically acceptable salts. The term "pharmaceutically acceptable salt" refers to a salt that possesses the effectiveness of the parent compound and is not biologically or otherwise undesirable (e.g., is neither toxic nor otherwise deleterious to the recipient thereof). Suitable salts include acid addition salts that may, for example, be formed by mixing a solution of the compound of the present technology with a solution of a pharmaceutically acceptable acid such as hydrochloric acid, sulfuric acid, acetic acid, trifluoroacetic acid, or benzoic acid. Certain of the compounds employed in the present technology may carry an acidic moiety (e.g., COOH or a phenolic group), in which case suitable pharmaceutically acceptable salts thereof can include alkali metal salts (e.g., sodium or potassium salts), alkaline earth metal salts (e.g., calcium or magnesium salts), and salts formed with suitable organic ligands such as quaternary ammonium salts. Also, in the case of an acid (COOH) or alcohol group being present, pharmaceutically acceptable esters can be employed to modify the solubility or hydrolysis characteristics of the compound.

The term "administration" and variants thereof (e.g., "administering" a compound) in reference to a compound mean providing the compound or a prodrug of the compound to the individual in need of treatment or prophylaxis. When a compound of the technology or a prodrug thereof is provided in combination with one or more other active agents, "administration" and its variants are each understood to include provision of the compound or prodrug and other agents at the same time or at different times. When the agents of a combination are administered at the same time, they can be administered together in a single composition or they can be administered separately. As used herein, the term "composition" is intended to encompass a product comprising the specified ingredients in the specified amounts, as well as any product that results, directly or indirectly, from combining the specified ingredients in the specified amounts.

By "pharmaceutically acceptable" is meant that the ingredients of the pharmaceutical composition must be compatible with each other and not deleterious to the recipient thereof.

The term "subject" or "patient" as used herein refers to an animal, preferably a mammal, most preferably a human, who has been the object of treatment, observation, or experiment.

The term "effective amount" as used herein means that amount of active compound or pharmaceutical agent (e.g., L-carnitine) that elicits the biological or medicinal response in a cell, tissue, organ, system, animal, or human that is being sought by a researcher, veterinarian, medical doctor, or other clinician. In some embodiments, the effective amount is a "therapeutically effective amount" for the alleviation of the symptoms of the disease or condition being treated. In some embodiments, the effective amount is a "prophylactically effective amount" for prophylaxis of the symptoms of the disease or condition being prevented. The term also includes herein the amount of active compound sufficient to treat sepsis and thereby elicit a response being sought. When the active compound is administered as the salt, references to the amount of active ingredient are to the free form (the non-salt form) of the compound. In some embodiments, the dosage of the compound or related compounds will generally range from 0.001 to 10,000 mg/kg/day or dose (e.g., 0.01 to 1000 mg/kg/day or dose; 0.1 to 100 mg/kg/day or dose).

In the method of the present technology, compounds, optionally in the form of a salt, can be administered by any means that produces contact of the active agent with the agent's site of action. They can be administered by any conventional means available for use in conjunction with pharmaceuticals, either as individual therapeutic agents or in a combination of therapeutic agents. They can be administered alone, but typically are administered with a pharmaceutical carrier selected on the basis of the chosen route of administration and standard pharmaceutical practice. The compounds of the technology can, for example, be administered orally, parenterally (including subcutaneous injections, intravenous, intramuscular, intrasternal injection, or infusion techniques), by inhalation spray, or rectally, in the form of a unit dosage of a pharmaceutical composition containing an effective amount of the compound and conventional non-toxic pharmaceutically-acceptable carriers, adjuvants, and vehicles. Liquid preparations suitable for oral administration (e.g., suspensions, syrups, elixirs, and the like) can be prepared according to techniques known in the art and can employ any of the usual media such as water, glycols, oils, alcohols, and the like. Solid preparations suitable for oral administration (e.g., powders, pills, capsules, and tablets) can be prepared according to techniques known in the art and can employ such solid excipients as starches, sugars, kaolin, lubricants, binders, disintegrating agents, and the like. Parenteral compositions can be prepared according to techniques known in the art and typically employ sterile water as a carrier and optionally other ingredients, such as a solubility aid. Injectable solutions can be prepared according to methods known in the art wherein the carrier comprises a saline solution, a glucose solution, or a solution containing a mixture of saline and glucose. Further description of methods suitable for use in preparing pharmaceutical compositions for use in the present technology and of ingredients suitable for use in the compositions is provided in *Remington's Pharmaceutical Sciences*, 18th edition, edited by A. R. Gennaro, Mack Publishing Co., 1990. Compounds of the present technology can be made by a variety of methods depicted in the synthetic reaction schemes provided herein. The starting materials and reagents used in preparing these compounds generally are either available from commercial suppliers, such as Aldrich Chemical Co., or are prepared by methods known to those skilled in the art following procedures set forth in references such as Fieser and Fieser's *Reagents for Organic Synthesis*, Wiley & Sons: New York, Volumes 1-21; R. C. LaRock, *Comprehensive Organic Transformations*, 2nd edition Wiley-VCH, New York 1999; *Comprehensive Organic Synthesis*, B. Trost and I. Fleming (Eds.) vol. 1-9 Pergamon, Oxford, 1991; *Comprehensive Heterocyclic Chemistry*, A. R. Katritzky and C. W. Rees (Eds) Pergamon, Oxford 1984, vol. 1-9; *Comprehensive Heterocyclic Chemistry II*, A. R. Katritzky and C. W. Rees (Eds) Pergamon, Oxford 1996, vol. 1-11; and *Organic Reactions*, Wiley & Sons: New York, 1991, Volumes 1-40.

DESCRIPTION

Provided herein is a technology related to identifying sepsis patients likely to respond to treatment with L-carnitine. In particular, embodiments of the technology provide methods and systems for identifying (e.g., differentiating) patients that disproportionately benefit from L-carnitine treatment (e.g., as measured by mortality) by measuring serum concentrations of acylcarnitines and/or other metabolites. During the development of embodiments of the technology provided, pharmacometabolomic experiments were conducted and data were collected that indicated numerous independent predictors of 90-day mortality in septic shock including many acyl-carnitines and other metabolites such as lactate, tyrosine, lysine, and glycine. In particular, pretreatment acetylcarnitine concentration identified a sepsis phenotype that benefits from L-carnitine supplementation.

During the development of embodiments of the technology, experiments were conducted to identify pre-treatment differences in sepsis-induced metabolic derangements in L-carnitine-treated sepsis survivors and non-survivors. Data collected from the experiments identified a metabolically distinct group of patients suffering from sepsis that have a significantly better outcome when they are treated with L-carnitine (e.g., approximately 18 g (e.g., approximately 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, or 25.0 g of L-carnitine). Further, the data collected indicated that pharmacometabolomic information identifies patients likely to respond to treatment with L-carnitine and thus provides information to select a treatment. In some embodiments, the technology provided herein relates to research programs and developing treatments in a clinical trial. In particular, data collected indicated that the technology provided herein finds use in providing a precision, clinical trial enrichment strategy using pharmacometabolomics that minimizes and/or eliminates the heterogeneity of sepsis in a cohort selected for study in a clinical trial.

As described herein, pharmacometabolomics experiments were conducted and data were collected that identified a sepsis phenotype that is clinically indistinguishable and has an increased likelihood to derive a mortality benefit from treatment with L-carnitine. In contrast, previous technologies have not considered the metabolic profile or state of patients. In particular, experiments were conducted using a metabolomics analysis to identify highly abundant polar compounds (e.g., using quantitative $^1$H-NMR) and acylcarnitines (e.g., using LC-MS) in serum samples collected from patients enrolled in a phase II clinical trial of L-carnitine therapy (8). Data collected during these experiments indicated that the most robust metabolic predictor of a mortality benefit from L-carnitine treatment is acetylcarnitine. Specifically, patients with higher (e.g., ≥36 µM) acetylcarnitine levels at enrollment are more likely to derive a treatment benefit (e.g., decreased intermediate term (e.g., 90-day) mortality) from L-carnitine treatment (e.g., with approximately 18 g of L-carnitine (e.g., e.g., approximately 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, or 25.0 g of supplemental L-carnitine)). Despite the observation that this group of patients had more organ dysfunction and higher SOFA scores (Table 7), organ dysfunction and higher SOFA scores alone do not identify the drug-responsive phenotype as indicated by acetylcarnitine level in serum retaining the discriminating power of identifying the patient class when accounting for other factors associated with the risk of death (e.g., age and SOFA score).

Further, while a pretreatment acetylcarnitine concentration of ≥36 µM was indicated as the most robust predictor of patient response to L-carnitine treatment based on statistical treatment of the data, further analysis of the same data indicated that a pretreatment acetylcarnitine concentration of ≥26 µM was the threshold concentration of acetylcarnitine at which patients began to trend towards a statistically significant reduction in mortality and/or treatment benefit from treatment with L-carnitine (18 g). See Table 6 and FIG. 3, scenario 2.

While acetylcarnitine has been associated with sepsis-induced organ dysfunction, inflammation, and infection (15), these data indicated that a clinically occult subgroup of patients is identified by metabolic state, e.g., acetylcarnitine level greater than or equal to 36 µM in serum, and benefits from treatment with L-carnitine. Furthermore, data collected during the experiments described herein indicated that the mortality benefit of L-carnitine treatment for this patient class depends on L-carnitine treatment dose (see, e.g., FIG. 1A and FIG. 4).

Thus, the technology described herein provides a new paradigm of sepsis care comprising precision treatment strategies based on metabolic state of a patient. For example, in some embodiments, the technology provided herein comprises using a metabolic biomarker (e.g., acetylcarnitine) to select an L-carnitine therapy for septic shock. Furthermore, the technology provided herein finds use in some embodiments to provide a metabolically informed clinical trial design (20), e.g., a pharmacometabolomics directed clinical trial to test L-carnitine therapy efficacy for septic shock using acetylcarnitine concentration to guide inclusion criteria.

In addition, data collected during the experiments described herein indicated that a plurality of metabolites have predictive value for sepsis mortality after controlling for factors associated with the risk of death (Table 5). These data further indicated that sepsis induces broad metabolic disruption that is linked to patient outcomes. In particular, numerous acylcarnitines (e.g., unsaturated acylcarnitines) predicted mortality, indicating a significant disruption in fatty acid metabolic pathways in sepsis patients (16). Without being bound by theory, the broad disruption of acylcarnitine metabolism may indicate a differential and variable mobilization of fatty acids (21) rather than disruption of a specific enzyme or pathway (see, e.g., 12). Despite this variance, acetylcarnitine was the most robust predictor of sepsis mortality and acetylcarnitine was detectable by both the LC-MS and NMR analytical platforms. Regardless of the detection method, acetylcarnitine performed similarly in the regression base model.

Data collected during the experiments described herein indicated that acetylcarnitine provided more predictive information than conventional indicators of sepsis mortality such as lactate level. In particular, lactate was not a significant independent predictor of mortality after correcting for age and SOFA score (Table 5). In contrast, acetylcarnitine provided predictive value after correcting for age and SOFA score, thus indicating that acetylcarnitine levels (e.g., in serum) provides a clinical test for sepsis risk and/or treatment. The cohort studied during the experiments described herein was highly selected and comprised only participants receiving vasopressors (which affect glycolysis and lactate production) (22, 23) who were already resuscitated, these data do not imply that lactate does not serve an important role in the early identification of patients with suspected infection. In particular, serial lactate levels and lactate clearance rate have been used to assess the adequacy of resuscitation and lactate is included in the sepsis definition (5, 24-26). Nevertheless, limitations of lactate have been recognized (24) and other metabolic markers have been suggested for use in predicting sepsis mortality (16). The data collected during the experiments described herein suggested that, in some embodiments, acetylcarnitine provides a superior risk stratification tool for resuscitated patients undergoing treatment with vasopressor infusions.

Figure 5:
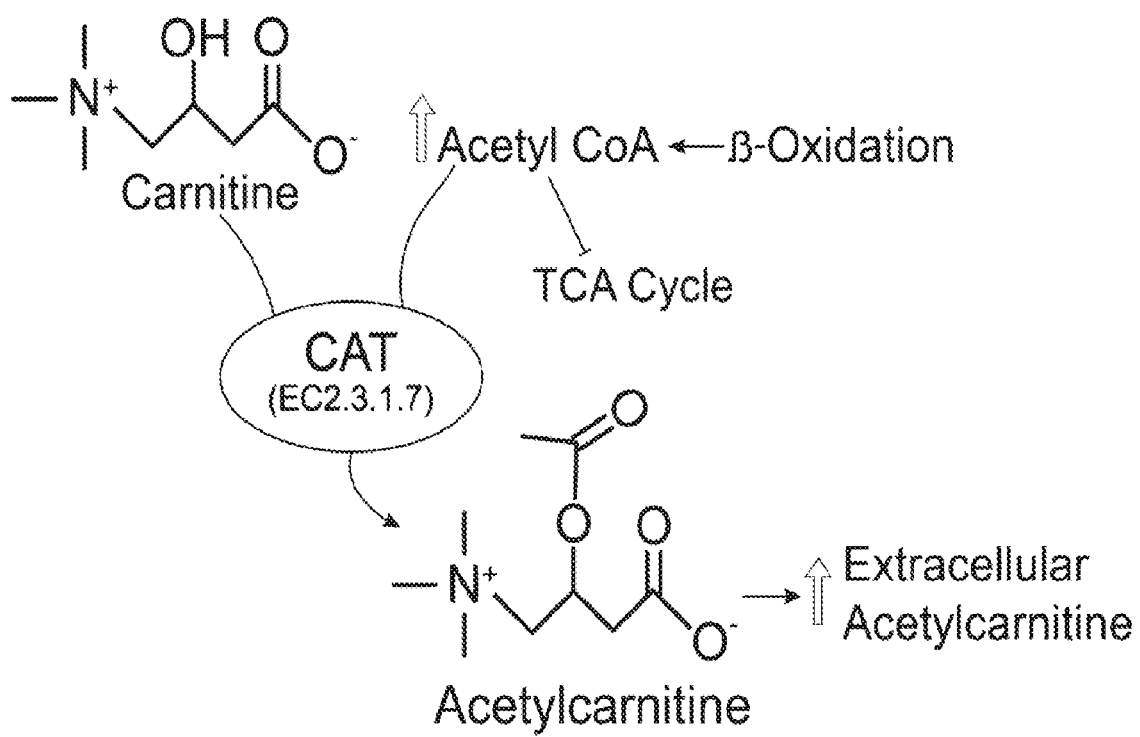
FIG. 5 is a schematic showing that a sepsis-induced altered flux through β-oxidation and TCA cycle energy pathways, including a possible TCA cycle "stall", may lead to increased levels of acetyl-CoA in mitochondria. These excess acetyl-groups are removed via carnitine acetyl-transferase (CAT)-mediated metabolism of carnitine converting it to acetylcarnitine. In the setting of sepsis (and without being bound by theory), this could provide a mechanism that explains the broad range of extracellular (serum) acetylcarnitine concentrations in sepsis patients. In patients with higher acetylcarnitine, the mortality benefit of supplemental L-carnitine may be driven by it serving as a "sink" for excess acetyl-CoA.

Importantly, data collected during the experiments described herein indicated that pre-treatment serum L-carnitine concentrations did not predict a L-carnitine treatment mortality benefit. Thus, the response to supplemental L-carnitine treatment by sepsis patients does not result from a pre-treatment serum L-carnitine deficiency. Rather, in aggregate, these data indicated that sepsis induces an impairment in the mobilization of acetyl groups throughout patient metabolic pathways. Without being bound by theory, these data may indicate that an increased intracellular accumulation of acetyl compounds that is secondary to a decreased acetyl-CoA metabolism via the tricarboxylic acid cycle (TCA) or enhanced acetyl-CoA production via fatty acid (beta-oxidation) metabolism (FIG. 5). Increases in acetyl-CoA are managed by a number of mechanisms including the mitochondrial enzyme carnitine acetyltransferase (EC 2.3.1.7). Carnitine acetyltransferase transfers acetyl groups to carnitine, displacing the hydrogen atom in its hydroxyl group (27) and converting it to the membrane-permeable acetylcarnitine (FIG. 5). Acetylcarnitine, the shortest of the acylcarnitines, is important in metabolic flexibility because it is involved in use acetyl-CoA during metabolic substrate switching (27). As the need for ATP increases, acetyl-CoA is diverted to the TCA cycle. However, in sepsis, the TCA cycle may fail to metabolize these groups and result in excess acetyl-CoA and subsequent elevation in measured serum acetylcarnitine concentrations. The ability of acetylcarnitine to serve as a route for the disposal of excess acetyl-CoA has been demonstrated in the myocardium (28). In sum, the data identified a critical serum acetylcarnitine concentration that reflects a "L-carnitine rescuable" sepsis-induced metabolic phenotype.

In some embodiments, the technology finds use to identify a patient class using pharmacometabolomics (e.g., to provide a clinical trial enrichment strategy). While metabolomics has been used previously to differentiate sepsis phenotypes (10, 16, 29), data collected during the experiments described herein indicated that metabolomics identifies metabolic phenotypes and patient classes for the informed design of clinical trials. Furthermore, the technology described herein provides a methodologic structure to reanalyze completed clinical trials that could inform the design of precision trials for diseases characterized by clinical heterogeneity that are likely to have a broad range of phenotypes. The technology described herein finds use in a variety of situations when identifying metabolic phenotypes and patient classes provides a substantial benefit over traditional trial design. For example, in situations where treatments may be beneficial to some patients but harmful to other patients, the technology finds use in discriminating and/or identifying patient subgroups in advance of clinical trial enrollment using the metabolomic profiling technology described herein. Alternatively, even if a therapy has a low risk of adverse events, a precision trial could still be valuable in decreasing the number of participants required to establish efficacy because it would exclude patients who are unlikely to benefit from the test treatment. These patients often complicate or completely eliminate any observed treatment advantage driving negative clinical trial results and sidelining candidate therapeutics. Either way, a clinical trial enrichment strategy may prove beneficial to clinical trialists intending to use data science to aid in more efficient trial designs. Finally, the data generated with this approach can provide insights into the metabolic mechanisms that underlie disease heterogeneity. Such observations may foster the identification of previously unrecognized drug target opportunities.

Treatment of Sepsis with L-Carnitine

Carnitine (e.g., L-carnitine or levocarnitine) is a substance involved in mammalian energy metabolism. It has been shown to facilitate long-chain fatty acid entry into cellular mitochondria, thereby delivering substrate for oxidation and subsequent energy production. Fatty acids are utilized as an energy substrate in all tissues except the brain. In skeletal and cardiac muscle, fatty acids are the main substrate for energy production.

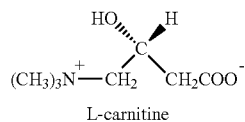

L-carnitine

Subjects

In some embodiments, the technology is related to administering carnitine to a subject in need of a treatment for sepsis. In some embodiments, the subject is in need of treatment for sepsis and does not have a metabolic disorder and/or an inborn error of metabolism; in some embodiments, the subject is in need of treatment for sepsis and has a metabolic disorder and/or an inborn error of metabolism. In some embodiments, the subject is in need of treatment for sepsis and has not been nor is being treated for metabolic disorder and/or an inborn error of metabolism; in some embodiments, the subject is in need of treatment for sepsis and is being treated and/or has been treated for metabolic disorder and/or an inborn error of metabolism.

In some embodiments, the subject has had an immune responses within a continuum from infection to multiple organ dysfunction syndrome. In some embodiments, the subject has systemic inflammatory response syndrome (SIRS), e.g., in some embodiments the subject has two or more of abnormal body temperature, abnormal heart rate, abnormal respiratory rate or blood gas, and/or abnormal white blood cell count. In some embodiments, the subject has SIRS in response to an infectious process, e.g., the subject has sepsis. In some embodiments, the subject has severe sepsis, e.g., the subject has sepsis and sepsis-induced organ dysfunction or tissue hypoperfusion (e.g., the subject has hypotension, elevated lactate, or decreased urine output). In some embodiments, the subject has severe sepsis, e.g., the subject has a natural immune response to an infection that triggers widespread inflammation and blood clotting in tiny vessels throughout the body. In some embodiments, the subject has failure of critical organs in the body. In some embodiments the subject has septic shock, e.g., the subject has severe sepsis and persistently low blood pressure.

In some embodiments, the subject has a serum level of an acylcarnitine (e.g., acetylcarnitine) that is greater than or equal to 36 µM (e.g., greater than or equal to approximately 36 µM (e.g., greater than or equal to 32.0, 32.2, 32.4, 32.6, 32.8, 33.0, 33.2, 33.4, 33.6, 33.8, 34.0, 34.2, 34.4, 34.6, 34.8, 35.0, 35.2, 35.4, 35.6, 35.8, 36.0, 36.2, 36.4, 36.6, 36.8, 37.0, 37.2, 37.4, 37.6, 37.8, 38.0, 38.2, 38.4, 38.6, 38.8, 39.0, 39.2, 39.4, 39.6, 39.8, 40.0, 40.2, 40.4, 40.6, 40.8, 41.0, 41.2, 41.4, 41.6, 41.8, 42.0, 42.2, 42.4, 42.6, 42.8, 43.0, 43.2, 43.4, 43.6, 43.8, 44.0, 44.2, 44.4, 44.6, 44.8, 45.0, 45.2, 45.4, 45.6, 45.8, 46.0, 46.2, 46.4, 46.6, 46.8, 47.0, 47.2, 47.4, 47.6, 47.8, 48.0, 48.2, 48.4, 48.6, 48.8, 49.0, 49.2, 49.4, 49.6, 49.8, or 50.0 µM acetylcarnitine in serum)). In some embodiments, the subject has a metabolic dysfunction caused by sepsis. In some embodiments, the subject has a dysfunctional acetyl metabolism caused by sepsis.

In some embodiments, the subject has a serum level of an acylcarnitine (e.g., acetylcarnitine) that is greater than or equal to 26 µM (e.g., greater than or equal to approximately 26 µM (e.g., greater than or equal to 22.0, 22.2, 22.4, 22.6, 22.8, 23.0, 23.2, 23.4, 23.6, 23.8, 24.0, 24.2, 24.4, 24.6, 24.8, 25.0, 25.2, 25.4, 25.6, 25.8, 26.0, 26.2, 26.4, 26.6, 26.8, 27.0, 27.2, 27.4, 27.6, 27.8, 28.0, 28.2, 28.4, 28.6, 28.8, 29.0, 29.2, 29.4, 29.6, 29.8, 30.0, 30.2, 30.4, 30.6, 30.8, 31.0, 31.2, 31.4, 31.6, 31.8, 32.0, 32.2, 32.4, 32.6, 32.8, 33.0, 33.2, 33.4, 33.6, 33.8, 34.0, 34.2, 34.4, 34.6, 34.8, 35.0, 35.2, 35.4, 35.6, 35.8, 36.0, 36.2, 36.4, 36.6, 36.8, 37.0, 37.2, 37.4, 37.6, 37.8, 38.0, 38.2, 38.4, 38.6, 38.8, 39.0, 39.2, 39.4, 39.6, 39.8, 40.0, 40.2, 40.4, 40.6, 40.8, 41.0, 41.2, 41.4, 41.6, 41.8, 42.0, 42.2, 42.4, 42.6, 42.8, 43.0, 43.2, 43.4, 43.6, 43.8, 44.0, 44.2, 44.4, 44.6, 44.8, 45.0, 45.2, 45.4, 45.6, 45.8, 46.0, 46.2, 46.4, 46.6, 46.8, 47.0, 47.2, 47.4, 47.6, 47.8, 48.0, 48.2, 48.4, 48.6, 48.8, 49.0, 49.2, 49.4, 49.6, 49.8, or 50.0 µM acetylcarnitine in serum)). In some embodiments, the subject has a metabolic dysfunction caused by sepsis. In some embodiments, the subject has a dysfunctional acetyl metabolism caused by sepsis.

Pharmaceutical Preparations and Dosages

It is generally contemplated that the carnitine treatments according to the technology are formulated for administration to a mammal, and especially to a human with a condition that is responsive to the administration of such compounds (e.g., sepsis). Therefore, where carnitine is administered in a pharmacological composition, it is contemplated that the carnitine is formulated in admixture with a pharmaceutically acceptable carrier. For example, carnitine can be administered orally as pharmacologically acceptable salts, or intravenously in a physiological saline solution (e.g., buffered to a pH of about 6.0 to 7.5). Conventional buffers such as phosphates, bicarbonates, or citrates can be used for this purpose. Of course, one of ordinary skill in the art may modify the formulations within the teachings of the specification to provide numerous formulations for a particular route of administration. In particular, contemplated compounds may be modified to render them more soluble in water or other vehicle, which for example, may be easily accomplished with minor modifications (salt formulation, esterification, etc.) that are well within the ordinary skill in the art. It is also well within the ordinary skill of the art to modify the route of administration and dosage regimen of a particular compound to manage the pharmacokinetics of the present compounds for maximum beneficial effect in a patient.

In certain pharmaceutical dosage forms, prodrug forms of carnitine may be formed for various purposes, including reduction of toxicity, increasing the organ or target cell specificity, etc. Among various prodrug forms, acylated (acetylated or other) derivatives, pyridine esters, and various salt forms of the present compounds are preferred. One of ordinary skill in the art will recognize how to readily modify the present compounds to prodrug forms to facilitate delivery of active compounds to a target site within the host organism or patient. One of ordinary skill in the art will also take advantage of favorable pharmacokinetic parameters of the prodrug forms, where applicable, in delivering the present compounds to a targeted site within the host organism or patient to maximize the intended effect of the compound. Similarly, it should be appreciated that a carnitine prodrug may also be metabolized to its biologically active form, and all metabolites of the compounds herein are therefore specifically contemplated. In addition, carnitine may be administered in combination with yet further agents.

With respect to administration to a subject, it is contemplated that the carnitine be administered in a pharmaceutically effective amount. One of ordinary skill recognizes that a pharmaceutically effective amount varies depending on the therapeutic agent used, the subject's age, condition, and sex, and on the extent of the disease in the subject. Generally, the dosage should not be so large as to cause adverse side effects, such as hyperviscosity syndromes, pulmonary edema, congestive heart failure, and the like. The dosage can also be adjusted by the individual physician or health care provider to achieve the desired therapeutic goal.

As used herein, the actual amount encompassed by the term "pharmaceutically effective amount" will depend on the route of administration, the type of subject being treated, and the physical characteristics of the specific subject under consideration. These factors and their relationship to determining this amount are well known to skilled practitioners in the medical, veterinary, and other related arts. This amount and the method of administration can be tailored to maximize efficacy but will depend on such factors as weight, diet, concurrent medication, and other factors that those skilled in the art will recognize.

Pharmaceutical compositions preferably comprise carnitine associated with one or more pharmaceutically acceptable carriers, diluents, or excipients. Pharmaceutically acceptable carriers are known in the art such as those described in, for example, *Remingtons Pharmaceutical Sciences*, Mack Publishing Co. (A. R. Gennaro edit. 1985), explicitly incorporated herein by reference for all purposes.

Accordingly, in some embodiments, the carnitine is formulated as a tablet, a capsule, a time release tablet, a time release capsule; a time release pellet; a slow release tablet, a slow release capsule; a slow release pellet; a fast release tablet, a fast release capsule; a fast release pellet; a sublingual tablet; a gel capsule; a microencapsulation; a transdermal delivery formulation; a transdermal gel; a transdermal patch; a sterile solution; a sterile solution prepared for use as an intramuscular or subcutaneous injection, for use as a direct injection into a targeted site, or for intravenous administration; a solution prepared for rectal administration; a solution prepared for administration through a gastric feeding tube or duodenal feeding tube; a suppository for rectal administration; a liquid for oral consumption prepared as a solution or an elixir; a topical cream; a gel; a lotion; a tincture; a syrup; an emulsion; or a suspension.

In some embodiments, the time release formulation is a sustained-release, sustained-action, extended-release, controlled-release, modified release, or continuous-release mechanism, e.g., the composition is formulated to dissolve quickly, slowly, or at any appropriate rate of release of the compound over time.

In some embodiments, the compositions are formulated so that the carnitine is embedded in a matrix of an insoluble substance (e.g., various acrylics, chitin) such that the dissolving carnitine finds its way out through the holes in the matrix, e.g., by diffusion. In some embodiments, the formulation is enclosed in a polymer-based tablet with a laser-drilled hole on one side and a porous membrane on the other side. Stomach acids push through the porous membrane, thereby pushing the drug out through the laser-drilled hole. In time, the entire drug dose releases into the system while the polymer container remains intact, to be excreted later through normal digestion. In some sustained-release formulations, the compound dissolves into the matrix and the matrix physically swells to form a gel, allowing the compound to exit through the gel's outer surface. In some embodiments, the formulations are in a micro-encapsulated form, e.g., which is used in some embodiments to produce a complex dissolution profile. For example, by coating the compound around an inert core and layering it with insoluble substances to form a microsphere, some embodiments provide more consistent and replicable dissolution rates in a convenient format that is combined in particular embodiments with other controlled (e.g., instant) release pharmaceutical ingredients, e.g., to provide a multipart gel capsule.

In some embodiments, the pharmaceutical preparations and/or formulations of the technology are provided in particles. "Particles" as used herein means nano- or microparticles (or in some instances larger) that can consist in whole or in part of the compounds as described herein. The particles may contain the preparations and/or formulations in a core surrounded by a coating, including, but not limited to, an enteric coating. The preparations and/or formulations also may be dispersed throughout the particles. The preparations and/or formulations also may be adsorbed into the particles. The particles may be of any order release kinetics, including zero order release, first order release, second order release, delayed release, sustained release, immediate release, and any combination thereof, etc. The particle may include, in addition to the preparations and/or formulations, any of those materials routinely used in the art of pharmacy and medicine, including, but not limited to, erodible, non-erodible, biodegradable, or nonbiodegradable materials or combinations thereof. The particles may be microcapsules which contain the formulation in a solution or in a semi-solid state. The particles may be of virtually any shape.

Both non-biodegradable and biodegradable polymeric materials can be used in the manufacture of particles for delivering the preparations and/or formulations. Such polymers may be natural or synthetic polymers. The polymer is selected based on the period of time over which release is desired. Bioadhesive polymers of particular interest include bioerodible hydrogels described by H. S. Sawhney, C. P. Pathak and J. A. Hubell in *Macromolecules*, (1993) 26: 581-587, the teachings of which are incorporated herein by reference. These include polyhyaluronic acids, casein, gelatin, glutin, polyanhydrides, polyacrylic acid, alginate, chitosan, poly(methyl methacrylates), poly(ethyl methacrylates), poly(butylmethacrylate), poly (isobutyl methacrylate), poly(hexylmethacrylate), poly(isodecyl methacrylate), poly(lauryl methacrylate), poly(phenylmethacrylate), poly(methyl acrylate), poly(isopropyl acrylate), poly(isobutyl acrylate), and poly(octadecyl acrylate).

The technology also provides methods for preparing stable pharmaceutical preparations containing aqueous solutions of carnitine or salts thereof to inhibit formation of degradation products. A solution is provided that contains carnitine or salts thereof and at least one inhibiting agent. The solution is processed under at least one sterilization technique prior to and/or after terminal filling the solution in the sealable container to form a stable pharmaceutical preparation. The present formulations may be prepared by various methods known in the art so long as the formulation is substantially homogenous, e.g., the pharmaceutical is distributed substantially uniformly within the formulation. Such uniform distribution facilitates control over drug release from the formulation.

In some embodiments, the carnitine is formulated with a buffering agent. The buffering agent may be any pharmaceutically acceptable buffering agent. Buffer systems include citrate buffers, acetate buffers, borate buffers, and phosphate buffers. Examples of buffers include citric acid, sodium citrate, sodium acetate, acetic acid, sodium phosphate and phosphoric acid, sodium ascorbate, tartaric acid, maleic acid, glycine, sodium lactate, lactic acid, ascorbic acid, imidazole, sodium bicarbonate and carbonic acid, sodium succinate and succinic acid, histidine, and sodium benzoate and benzoic acid.

In some embodiments, the carnitine is formulated with a chelating agent. The chelating agent may be any pharmaceutically acceptable chelating agent. Chelating agents include ethylenediaminetetraacetic acid (also synonymous with EDTA, edetic acid, versene acid, and sequestrene), and EDTA derivatives, such as dipotassium edetate, disodium edetate, edetate calcium disodium, sodium edetate, trisodium edetate, and potassium edetate. Other chelating agents include citric acid and derivatives thereof. Citric acid also is known as citric acid monohydrate. Derivatives of citric acid include anhydrous citric acid and trisodiumcitrate-dihydrate. Still other chelating agents include niacinamide and derivatives thereof and sodium desoxycholate and derivatives thereof.

In some embodiments, the carnitine is formulated with an antioxidant. The antioxidant may be any pharmaceutically acceptable antioxidant. Antioxidants are well known to those of ordinary skill in the art and include materials such as ascorbic acid, ascorbic acid derivatives (e.g., ascorbylpalmitate, ascorbylstearate, sodium ascorbate, calcium ascorbate, etc.), butylated hydroxy anisole, buylated hydroxy toluene, alkylgallate, sodium meta-bisulfate, sodium bisulfate, sodium dithionite, sodium thioglycollic acid, sodium formaldehyde sulfoxylate, tocopherol and derivatives thereof, (d-alpha tocopherol, d-alpha tocopherol acetate, dl-alpha tocopherol acetate, d-alpha tocopherol succinate, beta tocopherol, delta tocopherol, gamma tocopherol, and d-alpha tocopherol polyoxyethylene glycol 1000 succinate) monothioglycerol, and sodium sulfite. Such materials are typically added in ranges from 0.01 to 2.0%.

In some embodiments, the carnitine is formulated with a cryoprotectant. The cryoprotecting agent may be any pharmaceutically acceptable cryoprotecting agent. Common cryoprotecting agents include histidine, polyethylene glycol, polyvinyl pyrrolidine, lactose, sucrose, mannitol, and polyols.

In some embodiments, the carnitine is formulated with an isotonicity agent. The isotonicity agent can be any pharmaceutically acceptable isotonicity agent. This term is used in the art interchangeably with iso-osmotic agent, and is known as a compound which is added to the pharmaceutical preparation to increase the osmotic pressure, e.g., in some embodiments to that of 0.9% sodium chloride solution, which is iso-osmotic with human extracellular fluids, such as plasma. Preferred isotonicity agents are sodium chloride, mannitol, sorbitol, lactose, dextrose and glycerol.

The pharmaceutical preparation may optionally comprise a preservative. Common preservatives include those selected from the group consisting of chlorobutanol, parabens, thimerosol, benzyl alcohol, and phenol. Suitable preservatives include but are not limited to: chlorobutanol (0.3-0.9% w/v), parabens (0.01-5.0%), thimerosal (0.004-0.2%), benzyl alcohol (0.5-5%), phenol (0.1-1.0%), and the like.

In some embodiments, the carnitine is formulated with a humectant to provide a pleasant mouth-feel in oral applications. Humectants known in the art include cholesterol, fatty acids, glycerin, lauric acid, magnesium stearate, pentaerythritol, and propylene glycol.

In some embodiments, an emulsifying agent is included in the formulations, for example, to ensure complete dissolution of all excipients, especially hydrophobic components such as benzyl alcohol. Many emulsifiers are known in the art, e.g., polysorbate 60.

For some embodiments related to oral administration, it may be desirable to add a pharmaceutically acceptable flavoring agent and/or sweetener. Compounds such as saccharin, glycerin, simple syrup, and sorbitol are useful as sweeteners.

Administration, Treatments, and Dosing

In some embodiments, the technology relates to methods of providing a dosage of carnitine to a subject. In some embodiments, carnitine, a derivative thereof, or a pharmaceutically acceptable salt thereof, is administered in a pharmaceutically effective amount. In some embodiments, carnitine, a derivative thereof, or a pharmaceutically acceptable salt thereof, is administered in a therapeutically effective dose.

The dosage amount and frequency are selected to create an effective level of the compound without substantially harmful effects. When administered orally or intravenously, the dosage of the compound or related compounds will generally range from 0.001 to 10,000 mg/kg/day or dose (e.g., 0.01 to 1000 mg/kg/day or dose; 0.1 to 100 mg/kg/day or dose).

Methods of administering a pharmaceutically effective amount include, without limitation, administration in parenteral, oral, intraperitoneal, intranasal, topical, sublingual, rectal, and vaginal forms. Parenteral routes of administration include, for example, subcutaneous, intravenous, intramuscular, intrastemal injection, and infusion routes. In some embodiments, the compound, a derivative thereof, or a pharmaceutically acceptable salt thereof, is administered orally.

In some embodiments, a single dose of a compound or a related compound is administered to a subject. In other embodiments, multiple doses are administered over two or more time points, separated by hours, days, weeks, etc. In some embodiments, compounds are administered over a long period of time (e.g., chronically), for example, for a period of months or years (e.g., 1, 2, 3, 4, 5, 6, 7, 8, 9, 10, 11, 12, or more months or years). In such embodiments, compounds may be taken on a regular scheduled basis (e.g., daily, weekly, etc.) for the duration of the extended period.

The technology also relates to methods of treating a subject with carnitine for the subject's malady (e.g., sepsis). According to another aspect of the technology, a method is provided for treating a subject in need of such treatment (e.g., having a serum acetylcarnitine level equal to or greater than 26 μM and/or having a serum acetylcarnitine level equal to or greater than 36 μM) with an effective amount of carnitine or a salt thereof. The method involves administering to the subject an effective amount of carnitine or a salt thereof in any one of the pharmaceutical preparations described above, detailed herein, and/or set forth in the claims. The subject can be any subject in need of such treatment, e.g., for sepsis (e.g., a subject having a serum acetylcarnitine level equal to or greater than 26 μM and/or a subject having a serum acetylcarnitine level equal to or greater than 36 μM). In the foregoing description, the technology is in connection with carnitine or salts thereof. Such salts include, but are not limited to, bromide salts, chloride salts, iodide salts, carbonate salts, and sulfate salts. It should be understood, however, that the compound is a member of a class of compounds and the technology is intended to embrace pharmaceutical preparations, methods, and kits containing related derivatives within this class. Another aspect of the technology then embraces the foregoing summary but read in each aspect as if any such derivative is substituted wherever "carnitine" appears.

In some embodiments, a subject is tested to assess the presence, the absence, or the level of a malady such as sepsis. Such testing is performed, e.g., by assaying or measuring a detectable agent such as a biomarker or a metabolite as described herein, a physical symptom, an indication, etc., to determine the risk of or the presence of the malady or condition. For example, in some embodiments, a subject's level of acetylcarnitine is tested. In some embodiments, a subject's serum level of acetylcarnitine is tested. In some embodiments, a subject's serum level of acetylcarnitine is measured to be equal to or greater than 36 μM. In some embodiments, a subject's serum level of acetylcarnitine is measured to be equal to or greater than 26 μM.

In some embodiments, the subject is treated with carnitine based on the outcome of the test. In some embodiments, a subject is treated, a sample (e.g., serum) is obtained and the level of a detectable agent (e.g., acetylcarnitine) is measured, and then the subject is treated again based on the level of detectable agent that was measured. In some embodiments, a subject is treated, a sample is obtained and the level of detectable agent is measured, the subject is treated again based on the level of detectable agent that was measured, and then another sample is obtained and the level of detectable agent is measured. In some embodiments, other tests (e.g., not based on measuring the level of detectable agent) are also used at various stages, e.g., before the initial treatment as a guide for the initial dose. In some embodiments, a subsequent treatment is adjusted based on a test result, e.g., the dosage amount, dosage schedule, identity of the drug, etc. is changed. In some embodiments, a patient is tested, treated, and then tested again to monitor the response to therapy and/or change the therapy. In some embodiments, cycles of testing and treatment may occur without limitation to the pattern of testing and treating, the periodicity, or the duration of the interval between each testing and treatment phase. As such, the technology contemplates various combinations of testing and treating without limitation, e.g., test/treat, treat/test, test/treat/test, treat/test/treat, test/treat/test/treat, test/treat/test/treat/test, test/treat/test/treat/treat/treat/test, treat/treat/test/treat, test/treat/treat/test/treat/treat, etc.

Exemplary Carnitine Formulations and Dosages

In some specific embodiments, carnitine is provided as an injectable solution comprising 1 g of L-carnitine in a 5 ml volume. Carnitine is readily soluble in water and hot alcohol but is insoluble in acetone. In some embodiments the pH is adjusted to 6.0 to 6.5, e.g., with hydrochloric acid or sodium hydroxide. In some embodiments, carnitine is mixed in parenteral solutions of sodium chloride 0.9% or Lactated Ringer's in concentrations ranging from 250 mg/500 mL (0.5 mg/mL) to 4200 mg/500 mL (8.0 mg/mL) and stored at room temperature (25° C.) for up to 24 hours in PVC plastic bags.

In some embodiments, a subject is treated with approximately 18 g (e.g., approximately 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, or 25.0 g of L-carnitine).

The approximately 18-g dose of carnitine can be provided in many forms and in one or several doses. In some embodiments, carnitine is provided as an oral formulation, e.g., in a tablet or solution. Bioavailability studies indicated that carnitine provided in tablet form was bio-equivalent to carnitine provided in oral solution. For example, 4 days of dosing with 6×330-mg tablets of carnitine twice a day or 2 g of carnitine oral solution twice a day, the maximum plasma concentration ($C_{max}$) was about 80 μmol/liter and the time to maximum plasma concentration ($T_{max}$) occurred at 3.3 hours.

In some embodiments, L-carnitine is administered by infusion, e.g., over 1 to 24 hours, e.g., for approximately 12 hours. In some embodiments, L-carnitine is administered intravenously by syringe as a first bolus injection (in, e.g., 20 mL) over 2 to 3 minutes followed by a second bolus infusion over the following 12 hours.

In some embodiments, dosages are from 1 to 100 mg/kg (e.g., 1, 5, 10, 20, 30, 40, 50, 60, 70, 80, 90, or 100 mg/kg). In some embodiments, dosages are higher than 100 mg/kg, e.g., 200, 300, 400, or 500 mg/kg.

In some embodiments, a subject is treated with approximately 18 g of carnitine (e.g., approximately 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, or 25.0 g of L-carnitine). In some embodiments, 18 g of carnitine is administered in one dose or in a plurality of doses.

In some embodiments, a recommended dosage for metabolic disorders is approximately 50 mg/kg given as a slow 2 to 3 minute bolus injection or by infusion. In some embodiments, a loading dose is given in patients with severe metabolic crisis, followed by a second (e.g., equivalent or higher) dose over the following 24 hours. In some embodiments, it is administered every three or four hours, and usually not less than every 6 hours either by infusion or by intravenous injection. In some embodiments, subsequent daily doses are in the range of 50 mg/kg or as therapy may require. In studies of safety and efficacy, the highest dose administered has been 300 mg/kg.

In some embodiments, carnitine is provided as levocarnitine (CARNITOR®, sigma-tau Pharmaceuticals, Inc.)

Methods

The technology relates to methods for treating a subject (e.g., a subject having sepsis or a metabolic deficiency) with carnitine, methods for predicting a subject's response to treatment with carnitine, and methods for monitoring treatment of a subject with carnitine. In some embodiments, biomarkers (e.g., blood serum metabolites (e.g., an acylcarnitine)) measured prior to carnitine treatment are predictive of the level of carnitine that will be attained in the subject's blood after treatment with carnitine. In some embodiments, biomarkers (e.g., blood serum metabolites (e.g., an acylcarnitine)) measured prior to carnitine treatment are predictive of the subject's response to treatment with carnitine. Accordingly, biomarkers (e.g., blood serum metabolites (e.g., an acylcarnitine)) measured prior to carnitine treatment are used to identify subjects for whom treatment with carnitine is likely to be successful.

In some embodiments, methods comprise measuring an acylcarnitine in a patient serum sample. In some embodiments, the acylcarnitine is one or more of C12-carnitine, C8:1-carnitine, C10:1-carnitine, C5-carnitine, and/or acetylcarnitine. In some embodiments, the acylcarnitine is acetylcarnitine. As indicated by experimental data collected during the development of the technology described, a subject having a concentration of serum acetylcarnitine greater than or equal to 36 μM prior to treatment with carnitine is expected to respond better to treatment (e.g., have a lower chance of mortality) when compared to a subject with a lower pre-treatment acetylcarnitine serum level that is treated with carnitine. Accordingly, in some embodiments, methods comprise identifying a patient having a serum level of acetylcarnitine equal to or greater than 36 μM as carnitine-responsive. In some embodiments, the carnitine-responsive subject has sepsis and the carnitine administration remedies a metabolic abnormality associated with sepsis and/or lowers the chance of death. Furthermore, as indicated by additional treatment of the experimental data collected during the development of the technology described, a subject having a concentration of serum acetylcarnitine greater than or equal to 26 μM prior to treatment with carnitine is expected to respond better to treatment (e.g., have a lower chance of mortality) when compared to a subject with a lower pre-treatment acetylcarnitine serum level that is treated with carnitine. Accordingly, in some embodiments, methods comprise identifying a patient having a serum level of acetylcarnitine equal to or greater than 26 μM as carnitine-responsive. In some embodiments, the carnitine-responsive subject has sepsis and the carnitine administration remedies a metabolic abnormality associated with sepsis and/or lowers the chance of death.

In some embodiments, a combination of biomarkers is measured, e.g., one or more of C12-carnitine, C8:1-carnitine, C10:1-carnitine, C5-carnitine, and/or acetylcarnitine. In some embodiments, a serum level of greater than 0.18 μM C12-carnitine, greater than 0.84 μM C8:1-carnitine, greater than 0.60 μM C10:1-carnitine, greater than 0.30 μM C5-carnitine, and/or greater than 36 μM acetylcarnitine (C2) identifies a carnitine-responsive patient who will respond to treatment with carnitine. In some embodiments, a panel of biomarkers comprising any 1, 2, 3, 4, or 5 of C12-carnitine, C8:1-carnitine, C10:1-carnitine, C5-carnitine, and/or acetylcarnitine (C2) is measured. In some embodiments, a serum level of greater than 0.18 μM C12-carnitine, greater than 0.84 μM C8:1-carnitine, greater than 0.60 μM C10:1-carnitine, greater than 0.30 μM C5-carnitine, and/or greater than 26 μM acetylcarnitine (C2) identifies a carnitine-responsive patient who will respond to treatment with carnitine. In some embodiments, a panel of biomarkers comprising any 1, 2, 3, 4, or 5 of C12-carnitine, C8:1-carnitine, C10:1-carnitine, C5-carnitine, and/or acetylcarnitine (C2) is measured.

In some embodiments, a biomarker (e.g., one or more of C12-carnitine, C8:1-carnitine, C10:1-carnitine, C5-carnitine, and/or acetylcarnitine) is assayed, evaluated, or measured in combination with detecting a symptom associated with sepsis such as abnormal body temperature, abnormal heart rate, abnormal respiratory rate, abnormal blood gas, or abnormal white blood cell count; hypotension; elevated lactate; decreased urine output; inflammation; blood clotting; or persistently low blood pressure.

In some embodiments, treatment comprises administering carnitine in combination with one or more other therapeutic agents. For example, in some embodiments, carnitine is administered in a treatment regimen that also includes administering activated protein C. In some embodiments, carnitine and activated protein C are administered simultaneously and in some embodiments carnitine and activated protein C are administered sequentially (e.g., carnitine is administered after or before the activated protein C). In some embodiments carnitine is administered in a treatment regimen that also includes administering an antibiotic. In some embodiments, carnitine and an antibiotic are administered simultaneously and in some embodiments carnitine and an antibiotic are administered sequentially (e.g., carnitine is administered after or before the antibiotic).

After treatment with carnitine, some methods comprise measuring a biomarker that is associated with metabolic changes produced by carnitine treatment, e.g., to measure the effectiveness and/or progress of treatment. In some embodiments, changes in metabolite biomarkers are associated with monitoring and ameliorating adverse reactions to treatment with carnitine. For instance, the technology provides for monitoring treatment of sepsis in subjects with a metabolic disorder associated with one of the metabolites affected by treatment with carnitine to reduce or eliminate adverse responses to carnitine treatment. As a particular example, a subject having phenylketonuria (PKU) may be sensitive to increases in phenylalanine caused by carnitine treatment and thus the treatment could be monitored and adjusted accordingly to accommodate the subject's intolerance of phenylalanine.

In some embodiments, methods comprise performing an assay to measure the level of a biomarker, e.g., an acylcarnitine (e.g., one or more of C12-carnitine, C8:1-carnitine, C10:1-carnitine, C5-carnitine, and/or acetylcarnitine). In some embodiments, methods comprise performing an assay to measure the level of acetylcarnitine. In some embodiments, assays comprise use of nuclear magnetic resonance (NMR). In some embodiments, assays comprise use of liquid chromatography-mass spectrometry (LC-MS).

In some embodiments, methods comprise use of an antibody raised against an acylcarnitine, e.g., an antibody that specifically recognizes C12-carnitine, an antibody that specifically recognizes C8:1-carnitine, an antibody that specifically recognizes C10:1-carnitine, an antibody that specifically recognizes C5-carnitine, and/or an antibody that specifically recognizes acetylcarnitine. In some embodiments, an antibody finds use in an immunoassay to detect and/or quantify an acylcarnitine (e.g., one or more of C12-carnitine, C8:1-carnitine, C10:1-carnitine, C5-carnitine, and/or acetylcarnitine).

In some embodiments, the antibody is a monoclonal antibody and in some embodiments the antibody is a polyclonal antibody. In some embodiments, an antigen-specific antibody fragment is used (e.g., a Fab, a Fab', a F(ab'), a Fv fragment, a scFv fragment, or a linear antibody). Polyclonal antibodies can be prepared by any known method. Polyclonal antibodies can be raised by immunizing an animal (e.g., a rabbit, rat, mouse, donkey, etc.) by multiple subcutaneous or intraperitoneal injections of the relevant antigen (a purified peptide fragment, full-length recombinant protein, fusion protein, etc.) optionally conjugated to KLH, serum albumin, etc., diluted in sterile saline, and combined with an adjuvant to form a stable emulsion. The polyclonal antibody is then recovered from blood, ascites, and the like, of an animal so immunized. Collected blood is clotted, and the serum decanted, clarified by centrifugation, and assayed for antibody titer. The polyclonal antibodies can be purified from serum or ascites according to standard methods in the art including affinity chromatography, ion-exchange chromatography, gel electrophoresis, dialysis, etc.

For preparation of monoclonal antibodies, any technique that provides for the production of antibody molecules by continuous cell lines in culture may be used (see e.g., Harlow and Lane, Antibodies: A Laboratory Manual, Cold Spring Harbor Laboratory Press, Cold Spring Harbor, NY). These include, but are not limited to, the hybridoma technique originally developed by Köhler and Milstein and the trioma technique, the human B-cell hybridoma technique (See, e.g., Kozbor et al., Immunol. Today, 4:72 (1983)), and the EBV-hybridoma technique to produce human monoclonal antibodies (Cole et al., in Monoclonal Antibodies and Cancer Therapy, Alan R. Liss, Inc., pp. 77-96 (1985)). Monoclonal antibodies can also be generated by other methods known to those skilled in the art of recombinant DNA technology. For instance, combinatorial antibody display has can be utilized to produce monoclonal antibodies (see, e.g., Sastry et al., Proc. Nat. Acad. Sci. USA, 86: 5728 (1989); Huse et al., Science, 246: 1275 (1989); Orlandi et al., Proc. Nat. Acad. Sci. USA, 86:3833 (1989)). Alternatively, monoclonal antibodies can also be made using recombinant DNA methods as described in U.S. Pat. No. 4,816,567. The polynucleotides encoding a monoclonal antibody are isolated (e.g., from mature B-cells or hybridoma cells), by, e.g., RT-PCR using oligonucleotide primers that specifically amplify the genes encoding the heavy and light chains of the antibody, and their sequences are determined using conventional procedures. The isolated polynucleotides encoding the heavy and light chains are then cloned into suitable expression vectors, which, when transfected into host cells such as E. coli cells, simian COS cells, Chinese hamster ovary (CHO) cells, or myeloma cells that do not otherwise produce immunoglobulin protein, cause monoclonal antibodies to be generated by the host cells. Also, recombinant monoclonal antibodies or fragments thereof of the desired species can be isolated from phage display libraries as described (McCafferty et al., 1990, Nature, 348:552-554; Clackson et al., 1991, Nature, 352:624-628; and Marks et al., 1991, J. Mol. Biol., 222:581-597).

Data Analysis

In some embodiments, a computer-based analysis program is used to translate the biomarker data generated by a detection assay (e.g., the level of one or more biomarkers (e.g., one or more of C12-carnitine, C8:1-carnitine, C10:1-carnitine, C5-carnitine, and/or acetylcarnitine), e.g., as determined by using one or more detection reagents) into data of predictive value for a clinician. The clinician can access the predictive data using any suitable means. Thus, in some preferred embodiments, the present technology provides the further benefit that the clinician, who is not likely to be trained in genetics or molecular biology, need not understand the raw data. The data are presented directly to the clinician in its most useful form. The clinician is then able to utilize the information to optimize the care of the subject.

The present technology contemplates any method capable of receiving, processing, and transmitting the information to and from laboratories conducting the assays, information providers, medical personnel, and subjects. For example, in some embodiments of the present technology, a sample (e.g., blood, serum, plasma, etc.) is obtained from a subject and submitted to a profiling service (e.g., clinical lab at a medical facility, genomic profiling business, etc.) to generate raw data (e.g., the serum concentration of one or more of C12-carnitine, C8:1-carnitine, C10:1-carnitine, C5-carnitine, and/or acetylcarnitine). Where the sample comprises a tissue or other biological sample, the subject may visit a medical center to have the sample obtained and sent to the profiling center, or subjects may collect the sample themselves (e.g., a urine sample) and directly send it to a profiling center. Where the sample comprises previously determined biological information, the information may be directly sent to the profiling service by the subject (e.g., an information card containing the information may be scanned by a computer and the data transmitted to a computer of the profiling center using an electronic communication system). Once received by the profiling service, the sample is processed and a profile or report is produced that is specific for the diagnostic or prognostic information desired for the subject.

The profile data is then prepared in a format suitable for interpretation by a treating clinician. For example, rather than providing raw biomarker levels, the prepared format may represent a diagnosis or risk assessment (e.g., prognosis of sepsis or sepsis-related problems; prognosis of response to carnitine treatment; prognosis of mortality) for the subject, along with recommendations for particular treatment options (e.g., whether to administer carnitine and/or a carnitine dosage to administer). The data may be displayed to the clinician by any suitable method. For example, in some embodiments, the profiling service generates a report that can be printed for the clinician (e.g., at the point of care) or displayed to the clinician on a computer monitor.

In some embodiments, the information is first analyzed at the point of care or at a regional facility. The biomarker data is then sent to a central processing facility for further analysis and/or to convert the biomarker data to information useful for a clinician or patient. The central processing facility provides the advantage of privacy (all data is stored in a central facility with uniform security protocols), speed, and uniformity of data analysis. The central processing facility can then control the fate of the data following treatment of the subject. For example, using an electronic communication system, the central facility can provide data to the clinician, the subject, or researchers.

In some embodiments, the subjects or medical personnel are able to access the data and/or report using the electronic communication system. The subject may choose further intervention or counseling based on the results. In some embodiments, the data is used for research use. For example, the data may be used to further optimize the inclusion or elimination of biomarkers as useful indicators of a particular condition or stage of disease or as a companion diagnostic to determine a treatment course of action.

Although the disclosure herein refers to certain illustrated embodiments, it is to be understood that these embodiments are presented by way of example and not by way of limitation.

Example

Sepsis produces metabolic dysfunction in patients that may contribute to organ failure and death. L-carnitine has shown promise in the treatment of septic shock, but a recent clinical trial demonstrated a non-significant reduction in mortality. Accordingly, during the development of embodiments of the technology provide herein, experiments were conducted to use metabolomics data to identify patients most likely to benefit from L-carnitine treatment. In particular, metabolomics data were collected using $^1$H-NMR and LC-MS to quantify acylcarnitines in serum samples from a clinical trial of L-carnitine treatment. The primary outcome was 90-day mortality and the independent predictive value of each metabolite and the interaction of L-carnitine dose with the primary outcome was determined by logistic regression. A grid-search analysis maximizing the Z-statistic from a binomial proportion test was applied to identify the threshold concentrations that discriminated patients most likely to respond to L-carnitine. Analyzing the collected data identified nine $^1$H-NMR metabolites and eleven acylcarnitines that independently predicted 90-day mortality. Further, the grid-search analysis identified acetylcarnitine as the best metabolite to predict an L-carnitine mortality benefit in a patient. The data indicated that patients with acetylcarnitine levels greater than 36 µM were less likely to die at 90 days if treated with L-carnitine (69% vs 100%, p=0.02). In contrast, patients with acetylcarnitine levels less than 36 µM demonstrated no treatment benefit according to this statistical treatment that maximized the Z-statistic. Additional analysis of the data indicated that patients with acetylcarnitine levels greater than 26 µM received a treatment benefit from treatment with L-carnitine (18 g). Thus, metabolomics identified independent predictors of 90-day sepsis mortality.

Methods

Figure 6:
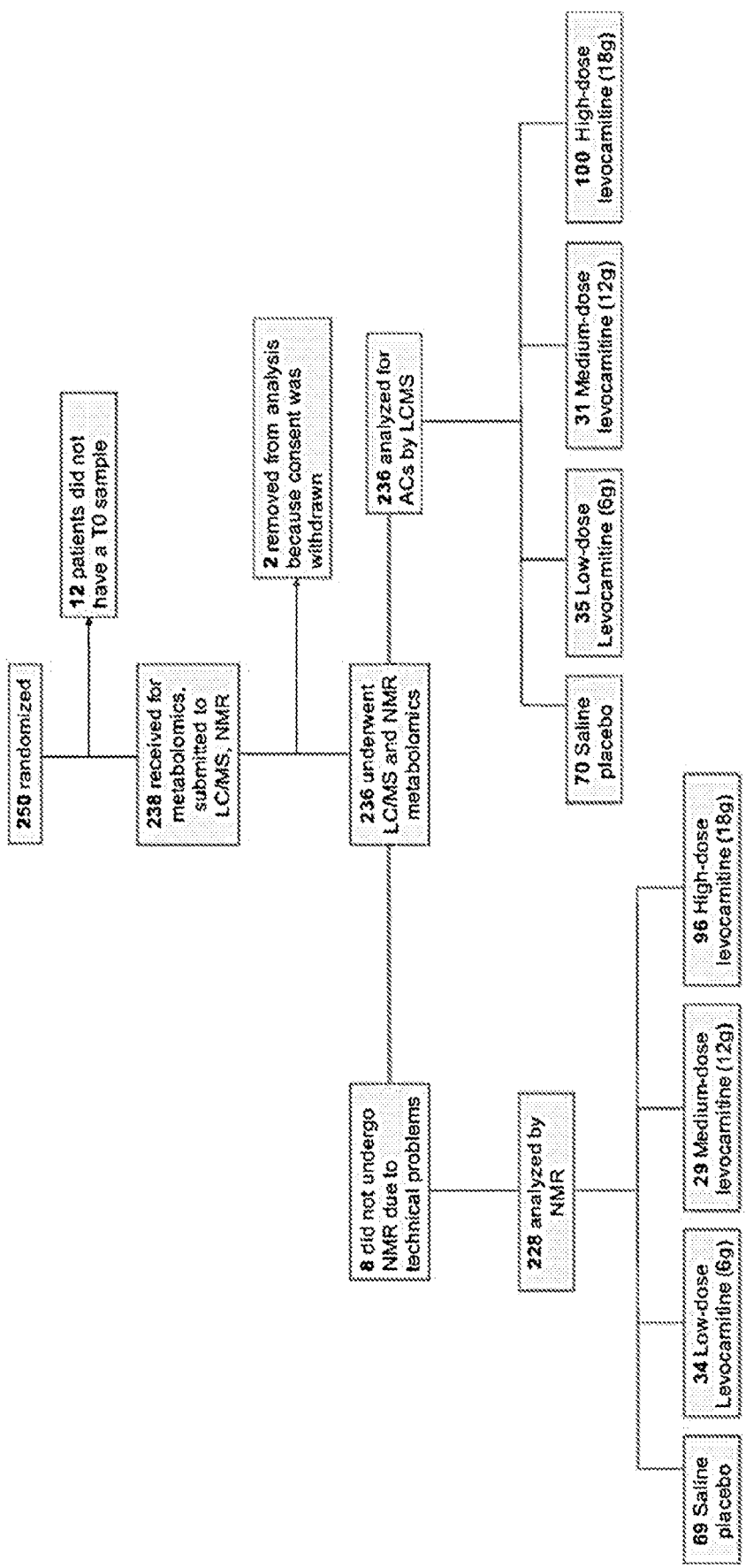
FIG. 6 is a consort diagram of patient samples for metabolomics analysis. A total of 250 patients were enrolled and randomized in the study. Twelve participants did not have a T0 blood sample because the sample was not collected. Of the total of 238 samples that were received for metabolomics analysis, two were excluded from analysis because of withdrawal of consent. Of the 236 samples that were submitted for NMR analysis, there were 8 that had insufficient volume or did not extract properly. The final data set are represented by 228 samples with NMR metabolomics data and 236 with acylcarnitine data.

Patient selection: Detailed inclusion and exclusion criteria have been previously reported (see, e.g., Jones (2018) "Effect of Levocarnitine vs Placebo as an Adjunctive Treatment for Septic Shock: The Rapid Administration of Carnitine in Sepsis (RACE) Randomized Clinical Trial" JAMA Netw Open 1: e186076, incorporated herein by reference). Briefly, patients presenting with suspected or confirmed infection and meeting consensus criteria for septic shock including administration of continuous vasopressors despite adequate fluid resuscitation, an elevated lactate>2 mmol/L, and a SOFA score of at least 5 were eligible for inclusion. All patients enrolled in the clinical trial were included in the present analysis with the exception of two patients who withdrew consent following randomization and 12 that lacked a T0 sample (FIG. 6).

Blood sampling. Following consent but prior to initiation of therapy, whole blood was drawn into serum separator tubes (SST; Vacutainer, Becton Dickinson, Franklin Lakes, NJ) and was allowed to clot for at least 30 minutes at room temperature. A portion of whole blood was aliquoted, while the remainder was centrifuged to yield serum. All samples were then frozen at −80° C. within 60 minutes of the initial sample acquisition. This approach has been previously utilized to yield samples appropriate for metabolomics analyses (see, e.g., Puskarich (2015) "Pharmacometabolomics of L-carnitine treatment response phenotypes in patients with septic shock" Ann Am Thorac Soc 12: 46-56, incorporated herein by reference). At the completion of the clinical trial, serum samples were shipped on dry ice to the University of Michigan for assay.

Sample handling Upon receipt, samples were inventoried, assigned a unique identifier and stored (−80° C.) until the time of assay. In preparation for assay, samples were randomized and batched. Samples from a total of 236 patients were assayed; 40 from the dose-response phase of RACE and 190 from the block randomization phase (see, e.g., Jones (2018) "Effect of Levocarnitine vs Placebo as an Adjunctive Treatment for Septic Shock: The Rapid Administration of Carnitine in Sepsis (RACE) Randomized Clinical Trial" JAMA Netw Open 1: e186076, incorporated herein by reference). Dose response samples were received, processed, and were assayed in advance and separately from the block randomization samples but the randomization schemes were the same for both and the resulting data were combined. For both metabolomics assays, each sample was assigned a random number and samples were ordered by this number for assay. A small volume (50 µL) from each sample was reserved for assay of free hemoglobin (see, e.g., Stringer (2015) "Whole Blood Reveals More Metabolic Detail of the Human Metabolome than Serum as Measured by 1H-NMR Spectroscopy: Implications for Sepsis Metabolomics" Shock 44: 200-208, incorporated herein by reference). The dose response samples were analyzed with Cayman Chemicals hemoglobin colorimetric assay (Ann Arbor, MI; catalog number 700540) and block randomization samples were analyzed with Arbor Assays hemoglobin high sensitivity detection kit (Ann Arbor, MI; catalog number K013-HX1).

Serum free hemoglobin: All samples were assayed for free hemoglobin to correct for distortion in the concentration of certain metabolites produced by a hemoglobin concentration greater than 0.1 g/dL (3). All but one (0.2 g/dL) of the assayed samples had a free hemoglobin concentration above 0.1 g/dL.

Measurement of Acylcarnitines: Analysis was performed consistent with prior methods (see, e.g., Puskarich (2018) "Septic Shock Nonsurvivors Have Persistently Elevated Acylcarnitines Following Carnitine Supplementation" Shock 49: 412-419, incorporated herein by reference). Briefly, at the time of analysis, serum samples were thawed on ice and extraction solvent was prepared consisting of a 1:1:1 mixture of methanol:acetonitrile:acetone plus a 1:200 dilution of a stock mixture of stable-isotope labeled acylcarnitine standards dissolved according to manufacturer instructions (NSK-B, Cambridge Isotope Laboratories). Acylcarnitine species were then analyzed without derivatization by RPLC-MS/MS using an Agilent 1200 LC coupled to an Agilent 6410 tandem quadrupole (Santa Clara, CA). A pooled sample generated by combining a small volume of all study samples was injected every 10th run and was used for intra-batch and inter-batch drift correction as described below. Absolute quantitation by isotope dilution mass spectrometry was performed for acylcarnitine species with exact-matching stable isotope internal standards (L-carnitine, C2, C3, C4, C5, C8, C14, C16) by multiplying the ratio of the unlabeled peak area/labeled peak area by the known concentration of acylcarnitine in the extraction solvent, then adjusting for dilution of the original serum sample. Other acylcarnitine species were limited to relative quantification by peak area.

Quantitative Nuclear Magnetic Resonance (NMR) metabolomics: Serum samples were prepared by methanol precipitation followed by ultrafiltration as previously described (see, e.g., McHugh (2018) "Rapid, Reproducible, Quantifiable NMR Metabolomics: Methanol and Methanol:Chloroform Precipitation for Removal of Macromolecules in Serum and Whole Blood" Metabolites 8(4). pii: E93, incorporated herein by reference). ¹H-NMR spectra were acquired at the University of Michigan Biochemical NMR Core Laboratory on a Varian (now Agilent, Inc., Santa Clara, CA) 11.74-Tesla (500-MHz) NMR spectrometer with a VNMRS console operated by host software VNMRJ 4.0 and equipped with a 5-mm Agilent "One-probe." NMR spectra were recorded using 32 scans of the first increment of a 1 H,1 H-NOESY (commonly referred to as a 1D-NOESY or METNOESY) pulse sequence. Spectra were acquired at a room temperature of 295.45±0.3 K. The NMR pulse sequence was as follows: a 1-s recovery delay, a 990-ms saturation pulse of 80-Hz (gB1) induced field strength empirically centered on the water resonance, 2 calibrated 90° pulses, a mixing time (tmix) of 100 ms, a final 90° pulse, and an acquisition period of 4 s. Optimal excitation pulse widths were obtained by utilizing an array of pulse lengths as previously described (see, e.g., Labaki (2019) "Serum amino acid concentrations and clinical outcomes in smokers: SPIROMICS metabolomics study" Sci Rep 9: 11367, incorporated herein by reference). Individuals, blinded to the treatment designation of each sample, analyzed NMR spectra (e.g., carnitine treatment) using Chenomx NMR Suite 8.2 (Edmonton, AB, Canada) software. The Processor module was used to phase shift, baseline correct, and excise water from each spectrum. Compounds were identified and quantified using the Profiler module of the software, which allows metabolites to be quantified relative to the area of the internal standard. Before statistical analysis, data were scaled to correct for differences in initial sample volumes. Only metabolites detected in at least 70% of all samples were considered in the analysis and some samples were excluded because of technical issues (see FIG. 6).

Preparation of metabolomics data for statistical analyses: Patients with any metabolomic data were included in the analyses. Assayed acylcarnitines were detected in all samples. Because the samples for the acylcarnitine assay were batched and assayed by LC-MS, batch related differences were assessed and corrected for within-batch intensity using custom-written scripts operating in R. These scripts use a local estimate of scatterplot smoothing (LOESS) to correct for within-batch and between-batch intensity drift in each acylcarnitine species individually based on peak intensity measured in a pooled QC sample run every 10th sample through all batches (see, e.g., Dunn (2011) "Human Serum Metabolome C. Procedures for large-scale metabolic profiling of serum and plasma using gas chromatography and liquid chromatography coupled to mass spectrometry" Nat Protoc 6: 1060-1083; Thonusin (2017) "Evaluation of intensity drift correction strategies using MetaboDrift, a normalization tool for multi-batch metabolomics data" J Chromatogr A 1523: 265-274, each of which is incorporated herein by reference). For the NMR data set, in preparation for statistical analysis and because concentration values for metabolites that are typically detected can be missing in the final data set, missing data were replaced with the minimum concentration of the respective metabolite across all samples divided in half. All detected metabolites and their Kyoto Encyclopedia of Genes and Genomes (KEGG) identification numbers are shown in Table 1. The entire data set can be found on the Metabolomics Workbench (www.metabolomicsworkbench.org; accession number ST001319).

TABLE 1

Acylcarnitines and ¹H-NMR Detected and Quantified Metabolites

| Acylcarnitines | | ¹H-NMR Metabolites | |
|---|---|---|---|
| Compound Name | KEGG ID⁺ | Compound Name | KEGG ID⁺ |
| Carnitine | C00318 | 2-Hydroxybutyrate | C05984 |
| C2-carnitine | C02571 | 2-Oxoisocaproate | C00233 |
| C3-carnitine | C03017 | 3-Hydroxybutyrate | C01089 |
| C4-carnitine | C02862 | Acetylcarnitine (C2) | C02571 |
| C5-carnitine | HMDB0013128* | Alanine | C00041 |
| C6-carnitine | HMDB0000756* | Betaine | C00719 |
| C8:1-carnitine | HMDB0013324* | Carnitine | C00318 |
| C8-carnitine | C02838 | Choline | C00114 |
| C10:1-carnitine | HMDB0240585* | Citrate | C00158 |
| C10-carnitine | C03299 | Creatine | C00300 |
| C12:1-carnitine | HMDB0013326* | Creatinine | C00791 |
| C12-carnitine | HMDB0002250* | Glucose | C00221 |
| C14:1-carnitine | HMDB0002014* | Glutamine | C00064 |
| C14-carnitine | HMDB0005066* | Glycine | C00037 |
| C16:1-carnitine | HMDB0006317* | Histidine | C00135 |
| C20:4-carnitine | HMDB0006455* | Isoleucine | C00407 |
| C18:2-carnitine | HMDB0006469* | Lactate | C00186 |
| C20:3-carnitine | N/A | Leucine | C00123 |
| C16:1-carnitine | C02990 | Lysine | C00047 |
| C18:1-carnitine | HMDB0006464* | Methionine | C00073 |
| C20:2-carnitine | N/A | Ornithine | C00077 |
| C18-carnitine | HMDB0000848* | Phenylalanine | C00079 |
| C20:1-carnitine | N/A | Proline | C00148 |
| C20-carnitine | HMDB0006455* | Propylene glycol | C00583 |
| | | Pyruvate | C00022 |
| | | Tyrosine | C00082 |
| | | Valine | C00183 |

Figure 7:
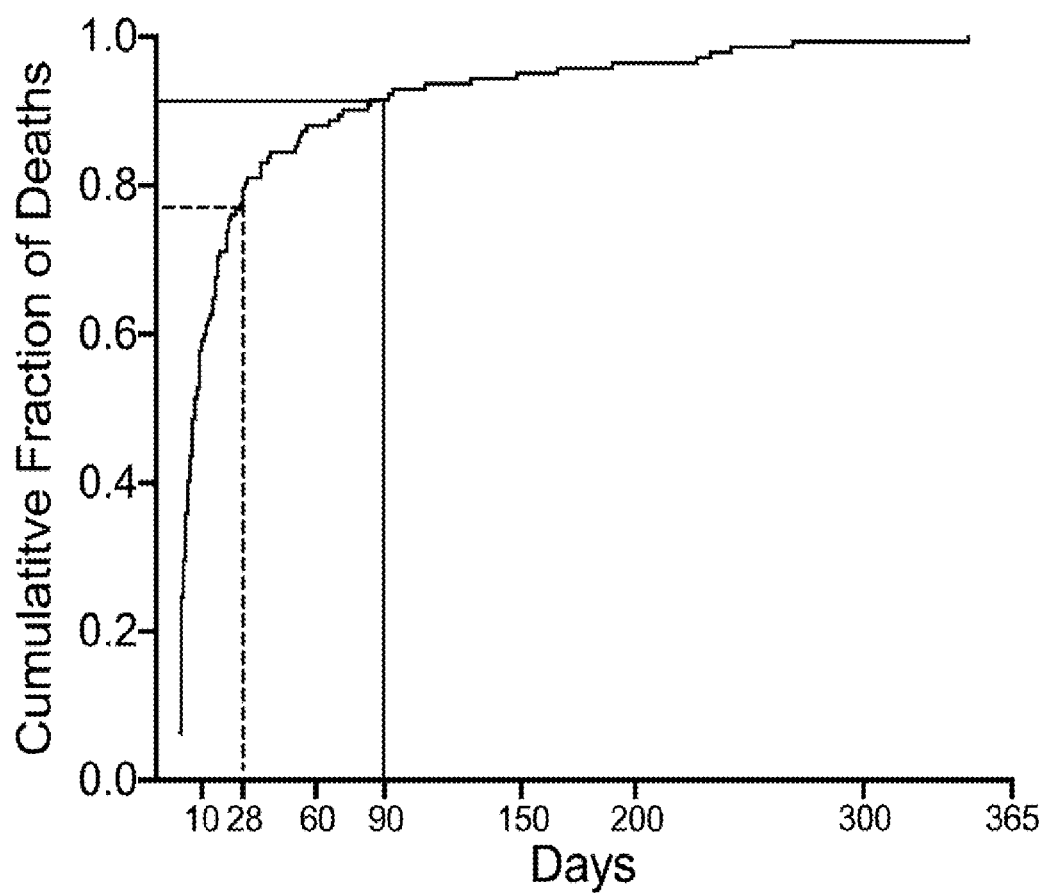
FIG. 7 is a plot showing the cumulative fraction of deaths of the patients who died in the Rapid Administration of Carnitine in Sepsis (RACE) clinical trial (8). The dotted line corresponds to the cumulative fraction of deaths at 28 days (0.78) and the solid line corresponds to the cumulative fraction of deaths at 90 days (0.91).

⁺Kyoto Encyclopedia of Genes and Genomes (KEGG) identification number
*Human metabolomics database (HMDB) identification number; KEGG ID not available
N/A = neither a KEGG nor HMDB ID is available Outcomes: Based on data suggesting a substantial continued decline in mortality among sepsis patients beyond 28 days and preliminary phase I data suggesting continued benefit from L-carnitine treatment on longer term mortality rates (see, e.g., Puskarich (2014) "Preliminary safety and efficacy of L-carnitine infusion for the treatment of vasopressor-dependent septic shock: a randomized control trial" JPEN J Parenter Enteral Nutr 38: 736-743, incorporated herein by reference), the cumulative distribution mortality function and the potential effect of L-carnitine were assessed based on the treatment interaction with mortality over 365 days to find the optimal time frame for assessment of mortality (28, 90, 180, or 365 days). By 90 days, 90% of the deaths occurred and the interaction term between L-carnitine treatment and mortality flattened (FIG. 7). Based on this analysis, 90-day mortality was chosen as the primary clinical outcome.

Statistical analysis: For logistic regression modeling, treatment assignment was scaled from 0 (placebo) to 1 (18 g L-carnitine) and age and SOFA score were z-scale normalized. Two main models were developed for each metabolite. The base model was described by log it(p)=$B_0$+$B_D$*Dose+$B_M$*Metabolite$_i$, where p is the probability of mortality in 90 days. The treatment interaction was modeled with:

$$\log it(p) = B_0 + (B_D * \text{Dose}) + (B_M * \text{Metabolite}_i) + (B_{MD} * \text{Metabolite}_i) * \text{Dose}$$

Figure 4:
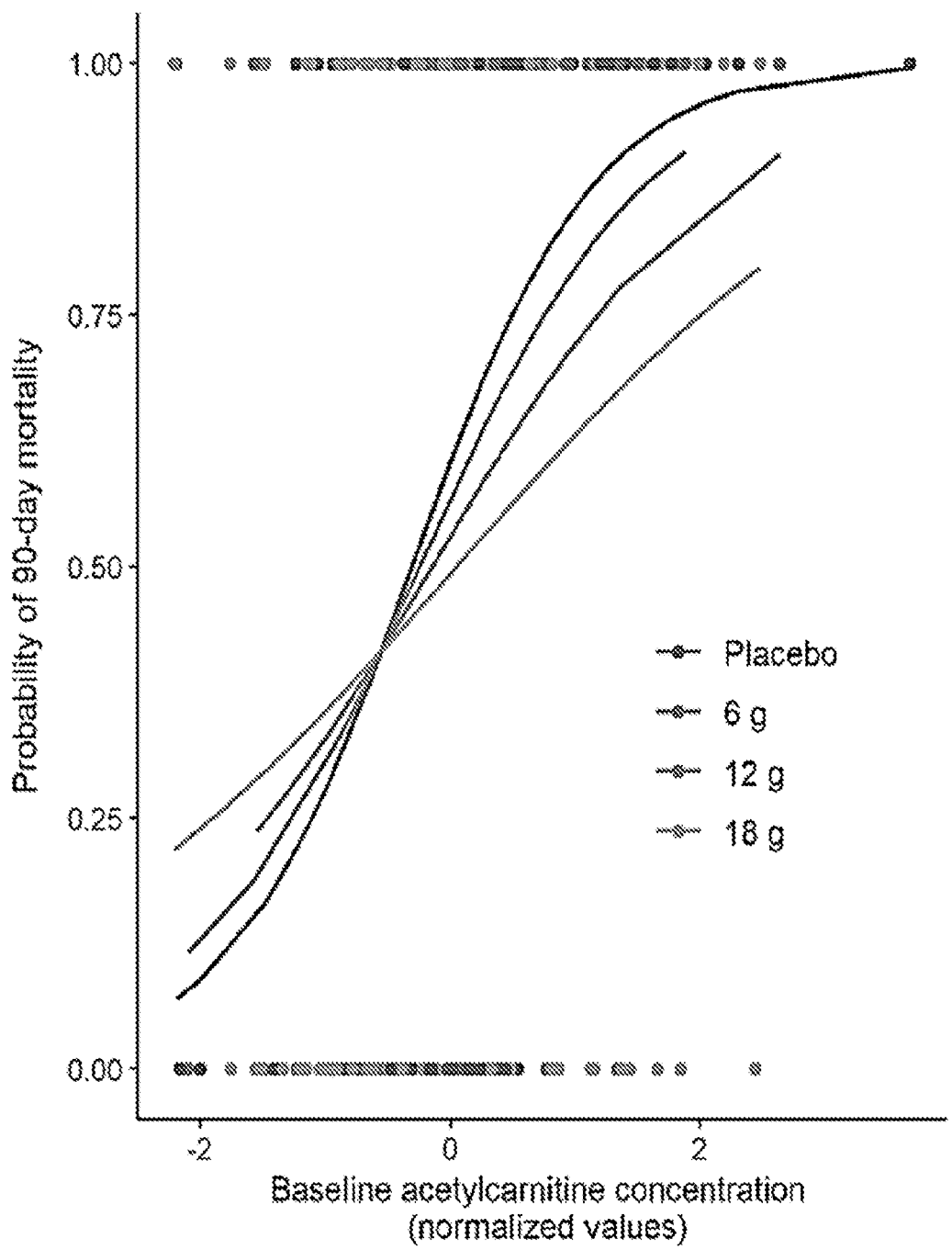
FIG. 4 is a plot showing that the predicted probability of 90-day mortality is associated with baseline (T0) acetylcarnitine concentration. Overall, the probability of 90-day mortality increases as baseline acetylcarnitine concentration increases regardless of treatment assignment. However, as baseline acetylcarnitine concentration increases, the probability of 90-day mortality declines with increasing L-carnitine dose. This indicates that a patient with an elevated acetylcarnitine level (>0 normalized concentration) is more likely to derive a mortality benefit from the 18-g dose of L-carnitine relative to placebo or other doses of L-carnitine. Notably, in patients with lower acetylcarnitine concentrations (<0 normalized concentration), the probability of death is not influenced by L-carnitine dose (see, e.g., FIG. 10). Colored data points represent observed patient outcomes for 90-day mortality, and colored lines represent the predicted probability according to the interaction logistic regression model described in Table 4.

Further multivariable models also included covariates associated with the risk of death (age and sequential organ failure assessment (SOFA) score) selected a priori to assess the independent prognostic value of each metabolite. In the base mode, the p-value corresponds to the likelihood ratio test for inclusion of the metabolite coefficient, $B_M$, compared to a nested model with only dose ($B_D$) as a predictor. For the interaction model, the p-value corresponds to the likelihood ratio test for inclusion of the interaction coefficient, $B_{MD}$, compared to a nested model with dose ($B_D$) and metabolite concentration ($B_M$) as predictors. For the base model, resulting p-values were adjusted for multiple comparison according to the Bonferroni correction (see, e.g., Goeman and Solari (2014) "Multiple hypothesis testing in genomics" Stat Med 33: 1946-1978, incorporated herein by reference). Given what appeared to be a difference in mortality based on L-carnitine dose in patients with low baseline acetylcarnitine concentration (<0 normalized concentration; FIG. 4). All statistical tests were performed in R studio (R version 3.6.2 (2019 Dec. 12), The R Foundation for Statistical Computing) and figures were constructed in PRISM (version 8.3.1, Nov. 27, 2019).

Figure 10:
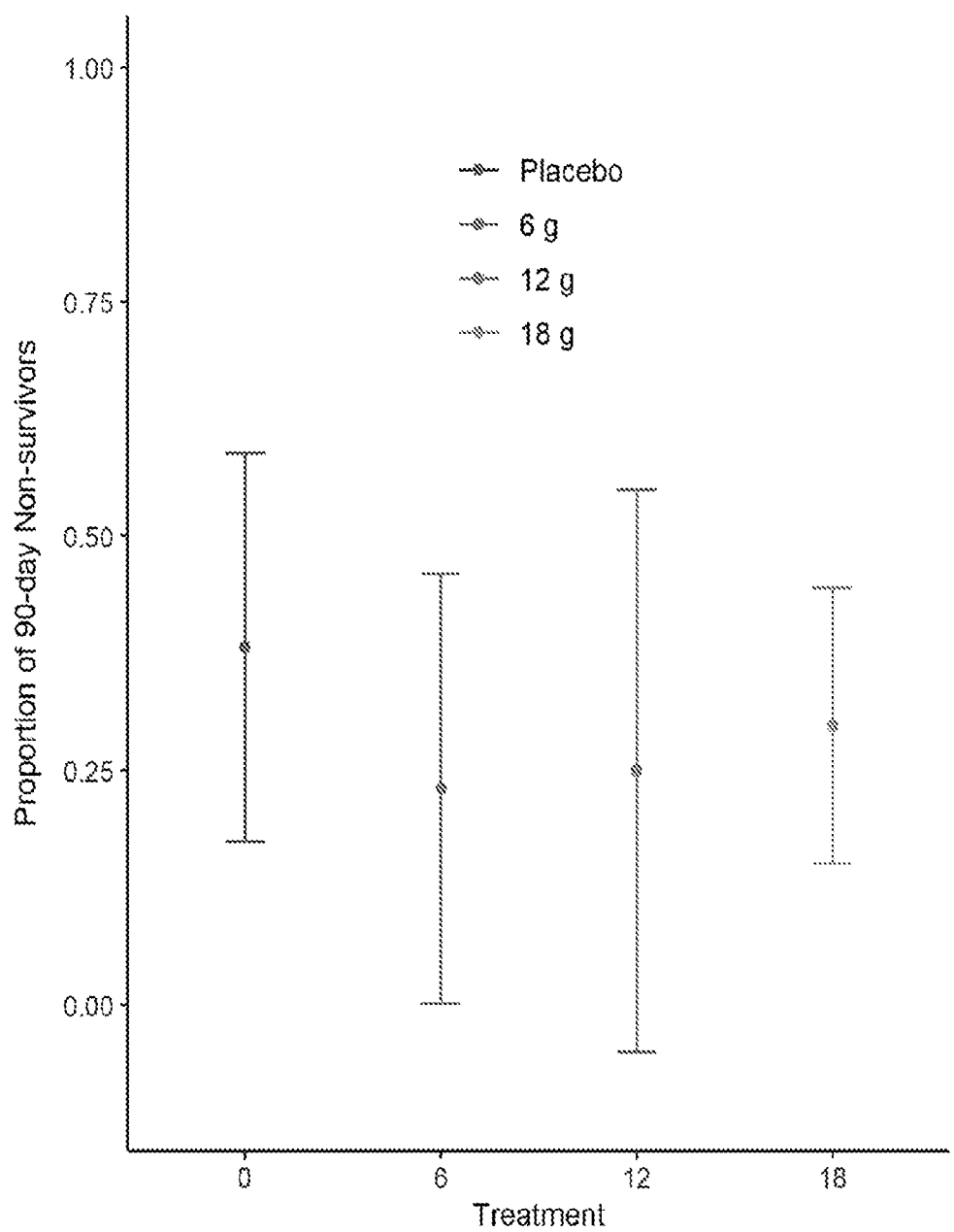
FIG. 10 shows that the observed proportion of septic shock non-survivors at 90-days is not significantly different across treatments received in patients with low baseline acetylcarnitine (C2) (<0 normalized acetylcarnitine concentration). Data are the proportion of non-survivors in each treatment group with the 95% confidence interval of the estimate. The normalized concentration range for the low acetylcarnitine (C2) group is [−2.21, −0.508] (n=79) and the proportion of 90-day non-survivors was not different between placebo or L-carnitine doses (p=0.81). Low-baseline acetylcarnitine (C2) are represented by n=21 placebo, n=13 L-carnitine 6 g, n=8 L-carnitine 12 g, and n=37 L-carnitine 18 g-treated patients.

90-day mortality stratified by dose inpatients with low acetylcarnitine concentrations: Patients were tertiled into groups based on normalized baseline acetylcarnitine as follows: low (normalized concentrations [−2.21, −0.508], n=79); medium (normalized concentrations [−0.508, 0.356], n=78); and high (normalized concentrations [−0.508, 0.356], n=79). The proportion of non-survivors at 90-days in the low baseline acetylcarnitine group is shown in FIG. 10 and is further stratified by dose received (also see FIG. 4). A Fisher's exact test was used to determine if mortality status at 90 days was independent from dose in the low acetylcarnitine group. In the low acetylcarnitine concentration group, mortality status at 90-days was not associated with dose received by Fisher's exact test (p=0.811). This implies that patients with lower baseline acetylcarnitine concentrations were not at greater risk of mortality if they received L-carnitine at any dose.

Figure 8:
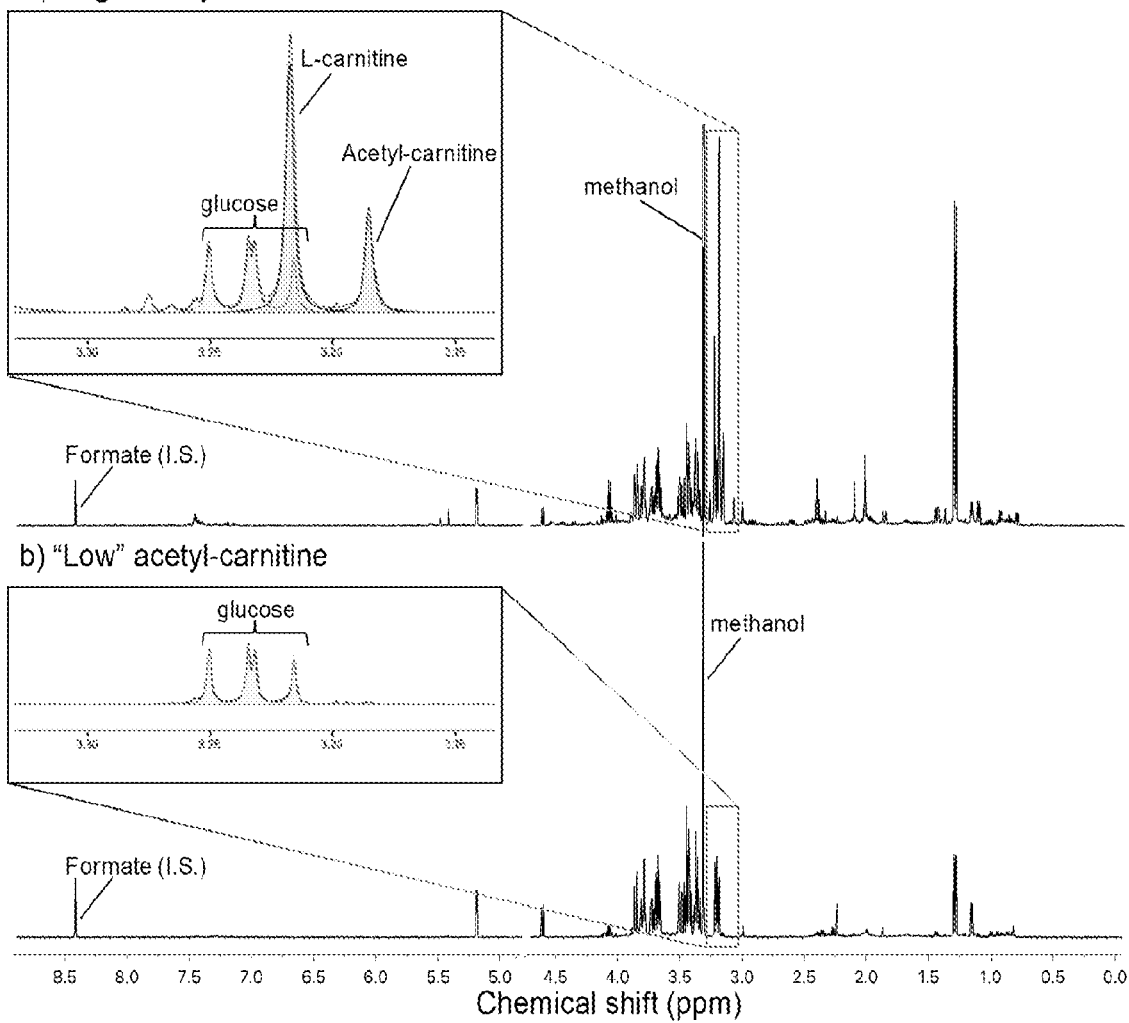
FIG. 8 shows representative proton ($^1$H) nuclear magnetic resonance (NMR) spectra of a serum sample from a patient with "high" acetyl-carnitine concentration (≥36 µM) (top panel (a)) and a "low" acetyl-carnitine concentration (<36 µM) (bottom panel (b)). Formate was added to each sample as the internal standard (I.S.). The compounds (glucose, L-carnitine and acetyl-carnitine) are the most abundant in the spectral region shown in the insets. Methanol is introduced into samples via the precipitation process.
Figure 9:
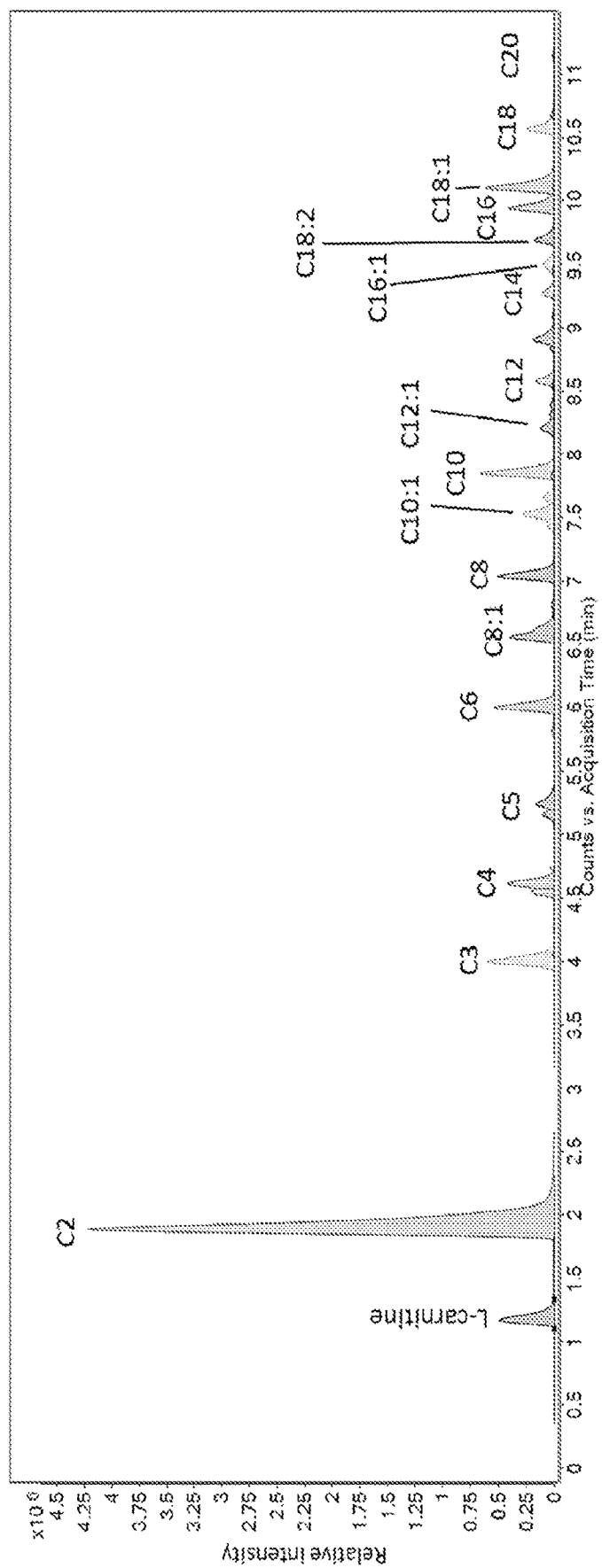
FIG. 9 shows a representative liquid chromatography-mass spectroscopy chromatogram of acylcarnitines in a pooled plasma sample. The chromatogram was generated by overlaying multiple reaction monitoring transitions for all detected acylcarnitine species; major species were identified by peak labels in the chromatogram. Isotopically-labeled internal standard peaks are omitted from this chromatogram for clarity, but essentially co-eluted with the matching unlabeled acylcarnitine species.

Results $^1$H-NMR metabolomics and acylcarnitine data were generated from 228 and 236 patient serum samples, respectively (see FIG. 6). Twenty-seven serum metabolites were identified and quantified by $^1$H-NMR and 24 acylcarnitines were identified and quantified by LC-MS (Table 1). Representative $^1$H-NMR and LC spectra are provided in FIGS. 8 and 9. The metabolomics data sets are available at the Metabolomics Workbench (www.metabolomicsworkbench.org; accession number ST001319). All-cause 90-day mortality was 124/236 (52.5%); 28-day and 1-year mortality were 104/236 (44.1%) and 136/236 (57.6%), respectively. Clinical and demographic variables of the cohort stratified by the primary outcome are summarized in Table 2. As expected, patients who died were older and had a higher SOFA score.

TABLE 2

Cohort Demographics and clinical characteristics stratified by 90-day mortality

| Variable | Survived (n = 111) | Died (n = 125) | p value |
|---|---|---|---|
| Demographics | | | |
| Age, years (IQR) | 61 (49, 69) | 66 (57, 76) | 0.002 |
| Male, n (%) | 60 (54) | 74 (41) | 0.43 |
| Female, n (%) | 51 (46) | 51 (59) | |
| Race | | | |
| Black, n (%) | 33 (30) | 39 (31) | 0.88 |
| Asian, n (%) | 3 (3) | 2 (2) | |
| White, n (%) | 68 (61) | 74 (59) | |
| Other, n (%) | 7 (6) | 10 (8) | |
| Ethnicity | | | |
| Hispanic, n (%) | 5 (4) | 7 (6) | 0.70 |
| Past medical history | | | |
| Diabetes, n (%) | 34 (31) | 46 (37) | 0.32 |
| Liver disease, n (%) | 11 (10) | 25 (20) | 0.03 |
| Renal disease, n (%) | 10 (10) | 24 (20) | 0.03 |
| Physiologic variables | | | |
| Heart rate, beats per minute (IQR) | 100 (84, 113) | 100 (87, 114) | 0.70 |
| Respiratory rate, breaths per minute (IQR) | 20 (16, 24) | 21 (18, 26) | 0.09 |
| Cumulative vasopressor index (IQR) | 4 (3, 8) | 6 (4, 8) | <0.001 |
| Body mass index (IQR) | 28 (25, 36) | 27 (22, 35) | 0.10 |
| Laboratory values | | | |
| White blood count, cells/mm$^3$ (IQR) | 22.0 (12.3, 28.7) | 16.1 (11.4, 23.7) | 0.24 |
| Platelet count, cells/mm$^3$ (IQR) | 161 (99, 232) | 129 (65, 210) | 0.02 |
| Creatinine, mg/dL (IQR) | 1.6 (1.1, 2.4) | 2.1 (1.4, 3.0) | 0.003 |
| Total Bilirubin, mg/dL (IQR) | 0.9 (0.5, 1.7) | 1.6 (0.7, 3.7) | <0.001 |
| Clinical lactate, mmol/L (IQR) | 3.1 (2.3, 4.8) | 4.9 (2.7, 8.4) | <0.001 |
| Severity of Illness | | | |
| SOFA score | 10 (8, 12) | 12 (9, 15) | <0.001 |

Figure 1B:
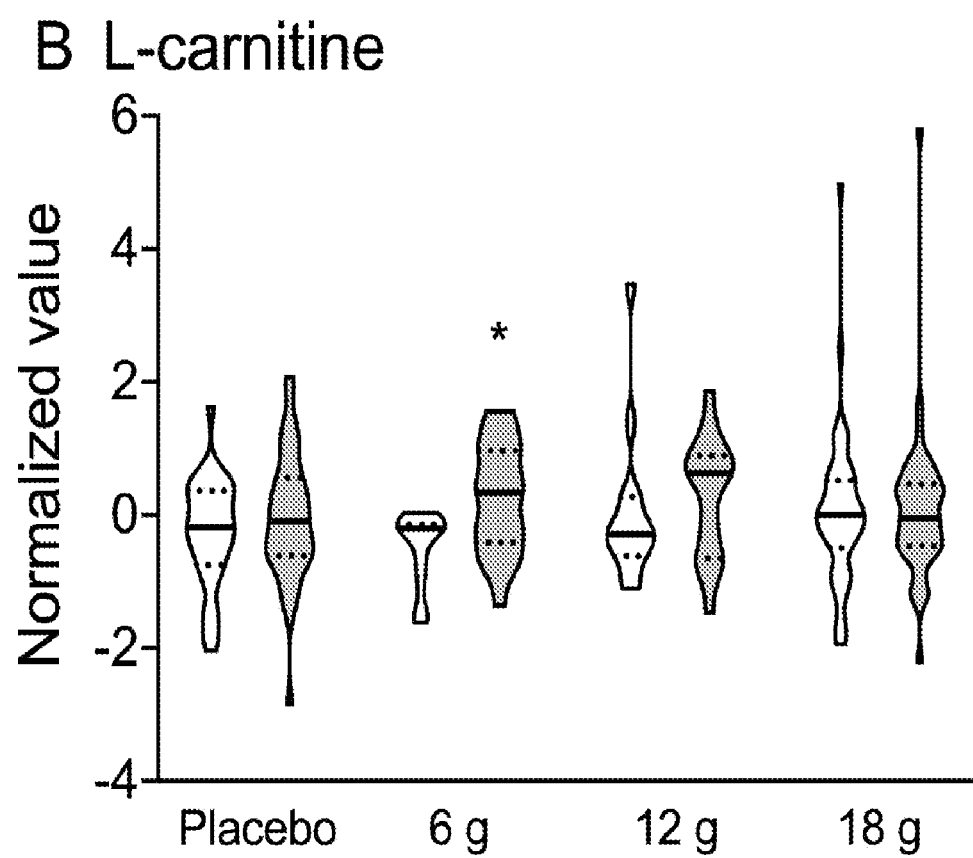
FIG. 1B is a violin plot showing differences in pre-treatment carnitine stratified by treatment arm.
Figure 1C:
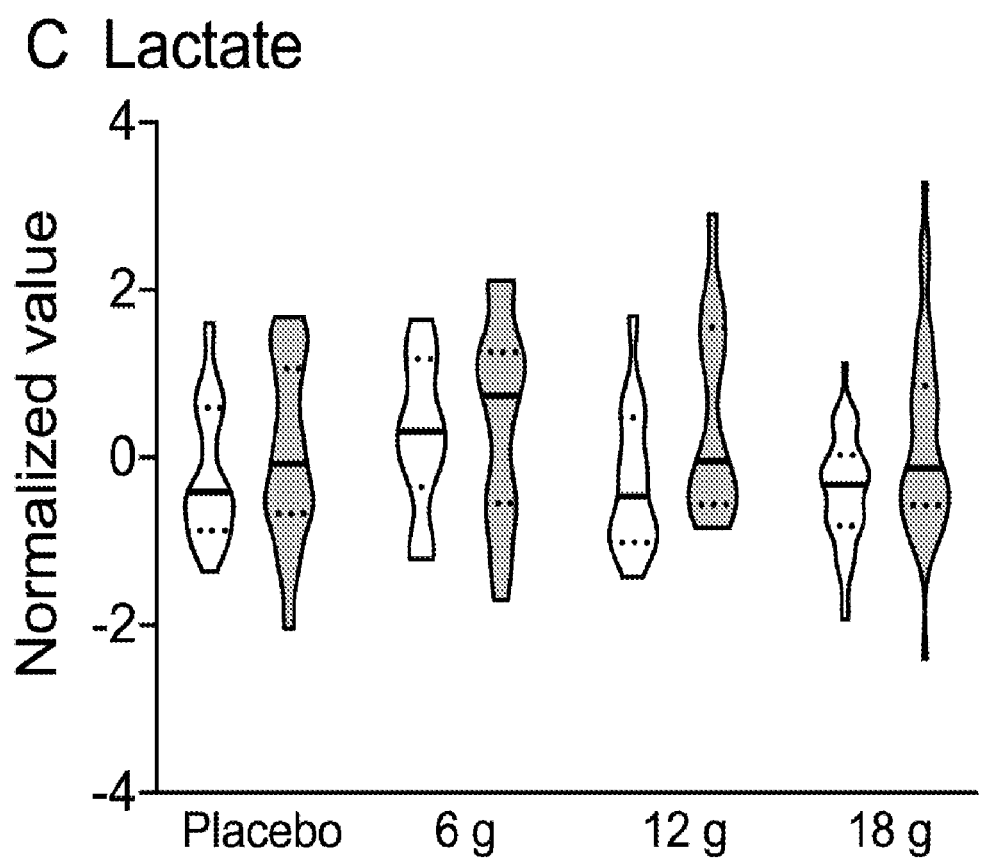
FIG. 1C is a violin plot showing differences in pre-treatment lactate stratified by treatment arm.
Figure 1D:
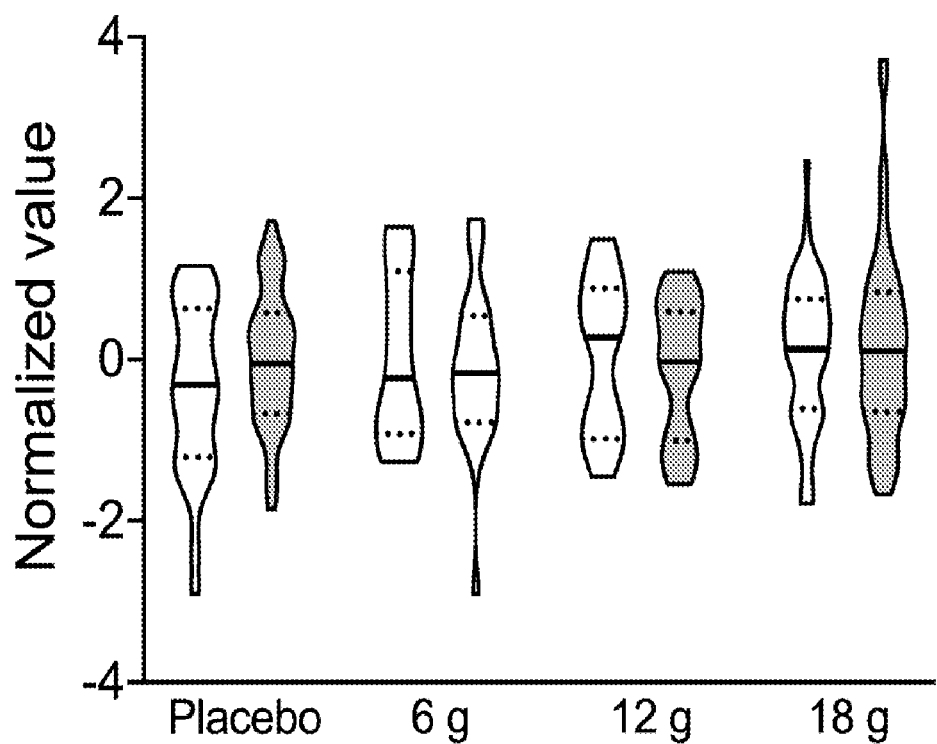
FIG. 1D is a violin plot showing differences in pre-treatment 3-hydroxybutyrate stratified by treatment arm.

Univariate analysis identified metabolites that differentiated 90-day mortality by L-carnitine dose (Table 3). Notably, pretreatment acetylcarnitine concentrations differed between survivors and non-survivors that received either placebo or the 6 g dose of L-carnitine (FIG. 5A) (16, 17). Neither L-carnitine (with the exception of the 6 g-treated patients), lactate, nor 3-hydroxybutyrate, which previously were observed to predict 1-year survival among L-carnitine treated patients (11), differentiated survivors from non-survivors (FIGS. 1B-1D).

TABLE 3

T0 Acylcarnitines and NMR-detected Metabolites by Carnitine Dose Ranked
by False Discovery Rate (FDR) based on an Unpaired Student's t-Test Comparison
Between 90-day Survivors vs Non-survivors

| Placebo (n = 69-71) | | Carnitine (6 g)<br>(n = 33-35) | | Carnitine (12 g)<br>(n = 29-31) | | Carnitine (18 g)<br>(n = 96-100) | |
|---|---|---|---|---|---|---|---|
| Compound | FDR (%) | Compound | FDR (%) | Compound | FDR (%) | Compound | FDR (%) |
| c16:1 carnitine | 0.51 | c3 carnitine | 0.51 | c8 carnitine | 3.06 | c18:1 carnitine | 7.65 |
| glycine | 0.51 | choline | 0.51 | c6 carnitine | 8.26 | lactate | 9.44 |
| Propylene glycol | 0.60 | c2 carnitine | 0.51 | methionine | 8.26 | tyrosine | 14.15 |
| c2 carnitine | 0.60 | acetylcarnitine | 0.64 | c2 carnitine | 8.26 | lysine | 14.15 |
| c14:1 carnitine | 0.60 | c8 carnitine | 0.82 | tyrosine | 8.26 | c20:1 carnitine | 14.15 |
| c16 carnitine | 0.60 | c8:1 carnitine | 1.19 | acetylcarnitine | 8.93 | Propylene glycol | 14.15 |
| c10:1 carnitine | 0.87 | c4 carnitine | 1.31 | c20:1 carnitine | 13.99 | glutamine | 14.15 |
| c18:1 carnitine | 0.89 | c6 carnitine | 1.85 | Propylene glycol | 20.46 | betaine | 14.15 |
| c14 carnitine | 1.08 | betaine | 2.75 | c3 carnitine | 22.95 | c2 carnitine | 14.85 |
| c12:1 carnitine | 1.31 | c10 carnitine | 2.75 | 2-OHB | 23.74 | c20 carnitine | 21.93 |
| proline | 1.31 | L-carnitine | 4.68 | c10:1 carnitine | 23.74 | creatinine | 27.69 |
| c18:2 carnitine | 1.31 | c18:1 carnitine | 4.68 | c10 carnitine | 26.34 | c3 carnitine | 27.69 |
| acetylcarnitine | 1.31 | c5 carnitine | 5.14 | lactate | 26.34 | alanine | 27.69 |
| c12 carnitine | 1.31 | c20:2 carnitine | 5.87 | creatine | 26.34 | acetylcarnitine | 27.69 |
| c20:1 carnitine | 1.53 | c10:1 carnitine | 6.46 | c4 carnitine | 27.98 | oxoisocaproate | 30.09 |
| c10 carnitine | 1.53 | tyrosine | 10.65 | histidine | 47.54 | c4 carnitine | 30.09 |
| c20 carnitine | 3.09 | c16 carnitine | 10.79 | c12:1 carnitine | 47.54 | c8:1 carnitine | 30.45 |
| c8 carnitine | 3.38 | c18:2 carnitine | 10.79 | glutamine | 47.54 | pyruvate | 32.02 |
| methionine | 3.38 | creatinine | 10.79 | pyruvate | 47.54 | histidine | 38.01 |
| citrate | 3.38 | c20:1 carnitine | 11.08 | glycine | 48.86 | ornithine | 39.76 |
| c5 carnitine | 3.38 | c12:1 carnitine | 11.08 | c8:1 carnitine | 48.86 | c14 carnitine | 39.76 |
| glutamine | 3.38 | lysine | 11.08 | proline | 48.89 | c16:1 carnitine | 40.41 |
| c18 carnitine | 3.50 | creatine | 11.60 | glucose | 51.27 | isoleucine | 40.41 |
| c20:2 carnitine | 3.95 | c16:1 carnitine | 12.69 | c18:1 carnitine | 52.08 | phenylalanine | 40.41 |
| c3 carnitine | 4.51 | c18 carnitine | 12.69 | betaine | 52.61 | glycine | 40.41 |
| carnitine | 4.67 | c14 carnitine | 12.69 | carnitine | 56.10 | c20:4 carnitine | 41.13 |
| alanine | 4.68 | carnitine | 13.15 | c5 carnitine | 57.48 | proline | 49.09 |
| betaine | 4.70 | phenylalanine | 13.30 | alanine | 61.05 | glucose | 50.89 |
| lysine | 6.51 | methionine | 15.96 | c20:4 carnitine | 61.29 | citrate | 53.41 |
| valine | 7.48 | c20 carnitine | 15.96 | ornithine | 62.05 | c16 carnitine | 54.69 |
| tyrosine | 7.49 | c20:4 carnitine | 16.09 | c16:1 carnitine | 62.05 | c20:2 carnitine | 54.69 |
| c8:1 carnitine | 7.94 | valine | 22.01 | c20:3 carnitine | 62.05 | c10:1 carnitine | 56.48 |
| creatinine | 14.05 | c20:3 carnitine | 22.01 | lysine | 62.05 | choline | 62.87 |
| leucine | 17.49 | leucine | 24.77 | phenylalanine | 63.99 | c18 carnitine | 62.87 |
| 3-OHB | 18.35 | c12 carnitine | 28.31 | c20 carnitine | 64.41 | carnitine | 72.62 |
| histidine | 18.76 | citrate | 30.23 | valine | 64.77 | methionine | 75.06 |
| c20:3 carnitine | 21.97 | isoleucine | 33.00 | c20:2 carnitine | 64.77 | c12:1 carnitine | 79.56 |
| phenylalanine | 22.08 | ornithine | 34.56 | c18 carnitine | 64.77 | c5 carnitine | 79.56 |
| c6 carnitine | 24.96 | proline | 39.35 | citrate | 64.77 | c18:2 carnitine | 79.56 |
| 2-OHB | 25.76 | c14:1 carnitine | 45.56 | isoleucine | 64.77 | 3-OHB | 90.48 |
| c4 carnitine | 27.05 | pyruvate | 45.56 | L-carnitine | 64.77 | L-carnitine | 90.48 |
| isoleucine | 30.49 | alanine | 45.56 | oxoisocaproate | 64.77 | leucine | 90.48 |
| L-carnitine | 33.60 | glycine | 45.56 | c14 carnitine | 73.25 | c20:3 carnitine | 90.48 |
| choline | 33.60 | Propylene glycol | 57.81 | 3-OHB | 73.25 | c8 carnitine | 90.48 |
| oxoisocaproate | 36.79 | glutamine | 57.81 | choline | 83.97 | creatine | 90.48 |
| lactate | 36.93 | 2-OHB | 57.81 | leucine | 83.97 | c10 carnitine | 90.48 |
| ornithine | 54.34 | glucose | 62.97 | c18:2 carnitine | 83.97 | c14:1 carnitine | 94.20 |
| creatine | 54.86 | lactate | 66.93 | c14:1 carnitine | 84.41 | c6 carnitine | 97.09 |
| c20:4 carnitine | 54.86 | histidine | 66.93 | c16 carnitine | 85.62 | 2-OHB | 97.09 |
| pyruvate | 74.16 | oxoisocaproate | 67.53 | creatinine | 92.14 | c12 carnitine | 97.09 |
| glucose | 88.03 | 3-OHB | 77.47 | c12 carnitine | 95.41 | valine | 99.20 |

Bolded compounds are acylcarnitines detected by LC-MS; all others are detected by NMR.
OHB = hydroxybutyrate;
C2 carnitine = acetylcarnitine;
the sample numbers in each group vary based on differences in the number of samples assayed by LC-MS and NMR (see main manuscript).

Multivariate logistic regression was conducted using L-carnitine dose and metabolites as covariates (base model) and a conservative Bonferroni correction was applied for multiple comparisons. The base model identified 9/27 $^1$H-NMR metabolites and 11/24 acylcarnitines that significantly discriminated 90-day mortality. However, when an interaction term between L-carnitine dose and metabolite level (interaction model) was added, the number of significant metabolites was reduced from 19 to 13, of which all but two metabolites were acylcarnitines (Table 4); this did not withstand adjustments for multiple comparisons.

TABLE 4

Logistic regression models for the prediction of 90-day mortality

| Metabolite predictor | Base model* | | | Interaction model[†] | | |
|---|---|---|---|---|---|---|
| | Metabolite Coefficient ($\beta_M$) | $\beta_M$ Standard Error | $\beta_M$ P value[‡] (Bonferonni) | Interaction Coefficient ($\beta_{M*D}$) | $\beta_{M*D}$ Standard Error | $\beta_{M*D}$ P value[‡] (raw) |
| Acetylcarnitine (C2)[§] | 0.854 | 0.164 | 3.87E−07 | −0.807 | 0.419 | 0.046 |
| C18:1-carnitine[§] | 0.836 | 0.167 | 1.23E−06 | −0.098 | 0.391 | 0.802 |
| Acetylcarnitine (C2)[∥] | 0.764 | 0.164 | 1.43E−05 | −0.573 | 0.396 | 0.139 |
| C20:1-carnitine[§] | 0.740 | 0.164 | 3.35E−05 | −0.099 | 0.385 | 0.797 |
| Tyrosine[∥] | 0.683 | 0.160 | 1.54E−04 | 0.158 | 0.385 | 0.682 |
| Betaine[∥] | 0.678 | 0.162 | 2.33E−04 | 0.021 | 0.384 | 0.957 |
| Propionylcarnitine (C3)[§] | 0.639 | 0.149 | 2.55E−04 | −0.419 | 0.362 | 0.240 |
| Propylene glycol[∥] | 0.659 | 0.155 | 2.75E−04 | −0.542 | 0.387 | 0.157 |
| C16:1-carnitine[§] | 0.601 | 0.150 | 0.001 | −0.838 | 0.376 | 0.021 |
| Lysine[∥] | 0.582 | 0.152 | 0.002 | 0.013 | 0.354 | 0.970 |
| Glycine[∥] | 0.564 | 0.148 | 0.003 | −0.621 | 0.354 | 0.076 |
| C20-carnitine[§] | 0.559 | 0.153 | 0.004 | −0.270 | 0.376 | 0.470 |
| Glutamine[∥] | 0.549 | 0.151 | 0.006 | −0.030 | 0.365 | 0.935 |
| C14-carnitine[§] | 0.529 | 0.146 | 0.007 | −0.557 | 0.349 | 0.104 |
| C16-carnitine[§] | 0.523 | 0.148 | 0.010 | −0.818 | 0.377 | 0.024 |
| Methionine[∥] | 0.512 | 0.147 | 0.013 | −0.404 | 0.336 | 0.228 |
| Lactate[∥] | 0.505 | 0.147 | 0.016 | 0.523 | 0.367 | 0.148 |
| C12:1-carnitine[§] | 0.506 | 0.150 | 0.019 | −0.695 | 0.371 | 0.056 |
| C4-carnitine[§] | 0.480 | 0.143 | 0.023 | −0.034 | 0.337 | 0.919 |
| C20:2-carnitine[§] | 0.488 | 0.150 | 0.027 | −0.369 | 0.360 | 0.300 |
| Proline[∥] | 0.469 | 0.143 | 0.034 | −0.520 | 0.337 | 0.117 |
| C8-carnitine[§] | 0.455 | 0.141 | 0.043 | −0.968 | 0.362 | 0.005 |
| Alanine[∥] | 0.462 | 0.144 | 0.046 | −0.128 | 0.348 | 0.713 |
| C18-carnitine[§] | 0.440 | 0.148 | 0.086 | −0.562 | 0.362 | 0.113 |
| Creatinine[∥] | 0.431 | 0.143 | 0.092 | −0.102 | 0.326 | 0.754 |
| C10-carnitine[§] | 0.409 | 0.139 | 0.128 | −0.966 | 0.359 | 0.005 |
| C5-carnitine[§] | 0.405 | 0.140 | 0.144 | −0.704 | 0.361 | 0.044 |
| Phenylalanine[∥] | 0.389 | 0.147 | 0.285 | −0.234 | 0.353 | 0.508 |
| Citrate[∥] | 0.362 | 0.143 | 0.451 | −0.473 | 0.340 | 0.163 |
| Carnitine[∥] | 0.352 | 0.141 | 0.519 | −0.636 | 0.357 | 0.068 |
| Histidine[∥] | 0.351 | 0.140 | 0.522 | 0.030 | 0.339 | 0.930 |
| C10:1-carnitine[§] | 0.341 | 0.138 | 0.577 | −1.221 | 0.373 | 0.000 |
| C6-carnitine[§] | 0.338 | 0.136 | 0.594 | −0.474 | 0.327 | 0.141 |
| C12-carnitine[§] | 0.311 | 0.137 | 1.0 | −0.771 | 0.334 | 0.018 |
| C18:2-carnitine[§] | 0.297 | 0.136 | 1.0 | −0.959 | 0.351 | 0.005 |
| Ornithine[∥] | 0.294 | 0.136 | 1.0 | 0.127 | 0.316 | 0.687 |
| C14:1-carnitine[§] | 0.285 | 0.135 | 1.0 | −0.902 | 0.337 | 0.006 |
| Creatine[∥] | 0.249 | 0.136 | 1.0 | −0.184 | 0.331 | 0.577 |
| Carnitine[5] | 0.249 | 0.140 | 1.0 | −0.438 | 0.332 | 0.184 |
| Pyruvate[∥] | 0.230 | 0.137 | 1.0 | 0.358 | 0.330 | 0.276 |
| Leucine[∥] | 0.205 | 0.136 | 1.0 | −0.454 | 0.336 | 0.171 |
| Choline[∥] | 0.196 | 0.135 | 1.0 | −0.735 | 0.327 | 0.022 |
| Valine[∥] | 0.183 | 0.136 | 1.0 | −0.690 | 0.351 | 0.045 |
| 2-hydroxybutyrate[∥] | 0.183 | 0.137 | 1.0 | −0.300 | 0.312 | 0.335 |
| C20:3-carnitine[§] | 0.166 | 0.135 | 1.0 | −0.387 | 0.319 | 0.219 |
| C8:1-carnitine[§] | 0.161 | 0.132 | 1.0 | −1.070 | 0.354 | 0.001 |
| C20:4-carnitine[§] | 0.108 | 0.142 | 1.0 | 0.441 | 0.435 | 0.214 |
| 3-hydroxybutyrate[∥] | 0.104 | 0.135 | 1.0 | −0.299 | 0.315 | 0.340 |

TABLE 4-continued

Logistic regression models for the prediction of 90-day mortality

| | Base model* | | | Interaction model† | | |
|---|---|---|---|---|---|---|
| Metabolite predictor | Metabolite Coefficient ($\beta_M$) | $\beta_M$ Standard Error | $\beta_M$ P value‡ (Bonferonni) | Interaction Coefficient ($\beta_{M*D}$) | $\beta_{M*D}$ Standard Error | $\beta_{M*D}$ P value‡ (raw) |
| Isoleucine‖ | 0.079 | 0.134 | 1.0 | −0.574 | 0.307 | 0.058 |
| Glucose‖ | 0.070 | 0.136 | 1.0 | 0.058 | 0.325 | 0.859 |
| Oxoisocaproate‖ | −0.055 | 0.135 | 1.0 | −0.741 | 0.342 | 0.027 |

*The base model is described as logit(p) = $B_0$ + $B_D$ * Dose + $B_M$ * Metabolite$_i$, where p is the probability of mortality in 90 days
†The interaction model is described as logit(p) = $B_0$ + $B_D$ * Dose + $B_M$ * Metabolite$_i$ + $B_{MD}$ * Metabolite$_i$ * Dose
‡p-values were calculated upon comparison to the appropriate nested model using the likelihood ratio test as described in the supplement methods section; raw p values are not adjusted for multiple comparisons.
§as measured by LC-MS
‖as measured by $^1$H-NMR In this analysis, a statistically significant and negative interaction term indicates that the predicted probability of 90-day mortality for a given metabolic feature is lower at higher doses of L-carnitine. To determine whether this signal was merely due to factors associated with the risk of death, the model controlled for both age (18) and SOFA score (19). Several acylcarnitines and choline tolerated this adjustment (see Table 5).

TABLE 5

Logistic regression models for the prediction of 90-day mortality adjusted for age and Sequential Organ Failure Assessment (SOFA) Score

| | Base model* | | | Interaction model† | | |
|---|---|---|---|---|---|---|
| Metabolite predictor | Metabolite Coefficient ($\beta_M$) | $\beta_M$ Standard Error | $\beta_M$ P value‡ (Bonferonni) | Interaction Coefficient ($\beta_{M*D}$) | $\beta_{M*D}$ Standard Error | $\beta_{M*D}$ P value‡ (raw) |
| C18:1-carnitine§ | 0.732 | 0.178 | 3.99E−04 | −0.023 | 0.411 | 0.955 |
| Acetylcarnitine (C2)§ | 0.697 | 0.173 | 0.001 | −0.823 | 0.431 | 0.049 |
| C20:1-carnitine§ | 0.669 | 0.175 | 0.002 | −0.052 | 0.409 | 0.898 |
| Betaine‖ | 0.621 | 0.178 | 0.009 | −0.123 | 0.410 | 0.763 |
| Acetylcarnitine (C2)§ | 0.573 | 0.170 | 0.020 | −0.460 | 0.406 | 0.249 |
| Tyrosine‖ | 0.550 | 0.165 | 0.023 | 0.104 | 0.399 | 0.793 |
| C16-carnitine§ | 0.528 | 0.161 | 0.028 | −0.853 | 0.408 | 0.030 |
| C16:1-carnitine§ | 0.526 | 0.160 | 0.030 | −0.902 | 0.408 | 0.021 |
| C20-carnitine§ | 0.529 | 0.162 | 0.030 | −0.166 | 0.398 | 0.674 |
| Propionylcarnitine (C3)§ | 0.493 | 0.157 | 0.062 | −0.354 | 0.380 | 0.346 |
| C18-carnitine§ | 0.463 | 0.159 | 0.114 | −0.488 | 0.388 | 0.201 |
| Lysine‖ | 0.473 | 0.160 | 0.115 | 0.003 | 0.365 | 0.994 |
| C20:2-carnitine§ | 0.453 | 0.160 | 0.155 | −0.394 | 0.379 | 0.294 |
| Glycine‖ | 0.473 | 0.164 | 0.155 | −0.689 | 0.384 | 0.069 |
| Glutamine‖ | 0.472 | 0.167 | 0.174 | −0.123 | 0.396 | 0.755 |
| C14-carnitine§ | 0.436 | 0.154 | 0.180 | −0.566 | 0.371 | 0.120 |
| C12:1-carnitine§ | 0.439 | 0.161 | 0.252 | −0.829 | 0.398 | 0.032 |
| Proline‖ | 0.412 | 0.156 | 0.356 | −0.571 | 0.365 | 0.112 |
| Propylene glycol‖ | 0.436 | 0.167 | 0.361 | −0.390 | 0.401 | 0.328 |
| Methionine‖ | 0.404 | 0.159 | 0.458 | −0.394 | 0.355 | 0.264 |
| Creatinine‖ | 0.351 | 0.151 | 0.915 | −0.027 | 0.347 | 0.938 |
| Lactate‖ | 0.370 | 0.161 | 0.956 | 0.471 | 0.393 | 0.224 |
| C10--carnitine§ | 0.342 | 0.148 | 0.977 | −0.942 | 0.373 | 0.009 |
| Carnitine§ | 0.079 | 0.150 | 1.0 | −0.349 | 0.355 | 0.323 |
| C4-carnitine§ | 0.310 | 0.154 | 1.0 | 0.158 | 0.356 | 0.657 |
| C5-carnitine§ | 0.237 | 0.152 | 1.0 | −0.572 | 0.378 | 0.120 |
| C6-carnitine§ | 0.176 | 0.147 | 1.0 | −0.367 | 0.341 | 0.277 |
| C8:1-carnitine§ | 0.088 | 0.144 | 1.0 | −1.058 | 0.372 | 0.003 |
| C8--carnitine§ | 0.305 | 0.149 | 1.0 | −0.872 | 0.372 | 0.015 |
| C10:1-carnitine§ | 0.257 | 0.149 | 1.0 | −1.233 | 0.389 | 0.001 |
| C12-carnitine§ | 0.301 | 0.147 | 1.0 | −0.882 | 0.368 | 0.013 |
| C14:1-carnitine§ | 0.270 | 0.146 | 1.0 | −0.980 | 0.369 | 0.006 |
| C20:4-carnitine§ | −0.063 | 0.161 | 1.0 | 0.859 | 0.783 | 0.048 |
| C18:2-carnitine§ | 0.283 | 0.148 | 1.0 | −0.933 | 0.375 | 0.010 |
| C20:3-carnitine§ | 0.204 | 0.153 | 1.0 | −0.335 | 0.340 | 0.330 |
| 2-Hydroxybutyrate‖ | 0.112 | 0.150 | 1.0 | −0.191 | 0.328 | 0.562 |

TABLE 5-continued

Logistic regression models for the prediction of 90-day mortality adjusted for age and Sequential Organ Failure Assessment (SOFA) Score

| | Base model* | | | Interaction model[†] | | |
|---|---|---|---|---|---|---|
| Metabolite predictor | Metabolite Coefficient ($\beta_M$) | $\beta_M$ Standard Error | $\beta_M$ P value[‡] (Bonferonni) | Interaction Coefficient ($\beta_{M*D}$) | $\beta_{M*D}$ Standard Error | $\beta_{M*D}$ P value[‡] (raw) |
| Oxoisocaproate[∥] | −0.003 | 0.149 | 1.0 | −0.415 | 0.376 | 0.266 |
| 3-Hydoxybutyrate[∥] | 0.105 | 0.149 | 1.0 | −0.290 | 0.344 | 0.399 |
| Alanine[∥] | 0.346 | 0.157 | 1.0 | −0.148 | 0.373 | 0.692 |
| Carnitine[∥] | 0.195 | 0.153 | 1.0 | −0.608 | 0.379 | 0.103 |
| Choline[∥] | 0.122 | 0.147 | 1.0 | −0.681 | 0.348 | 0.047 |
| Citrate[∥] | 0.277 | 0.155 | 1.0 | −0.465 | 0.373 | 0.212 |
| Creatine[∥] | 0.099 | 0.152 | 1.0 | −0.243 | 0.360 | 0.499 |
| Glucose[∥] | 0.042 | 0.146 | 1.0 | 0.042 | 0.352 | 0.906 |
| Histidine[∥] | 0.243 | 0.154 | 1.0 | −0.138 | 0.357 | 0.698 |
| Isoleucine[∥] | 0.087 | 0.147 | 1.0 | −0.449 | 0.331 | 0.172 |
| Leucine[∥] | 0.225 | 0.153 | 1.0 | −0.363 | 0.364 | 0.317 |
| Ornithine[∥] | 0.290 | 0.149 | 1.0 | 0.236 | 0.343 | 0.490 |
| Phenylalanine[∥] | 0.342 | 0.161 | 1.0 | −0.097 | 0.377 | 0.797 |
| Pyruvate[∥] | 0.125 | 0.150 | 1.0 | 0.408 | 0.351 | 0.242 |
| Valine[∥] | 0.213 | 0.152 | 1.0 | −0.520 | 0.384 | 0.171 |

Figure 2:
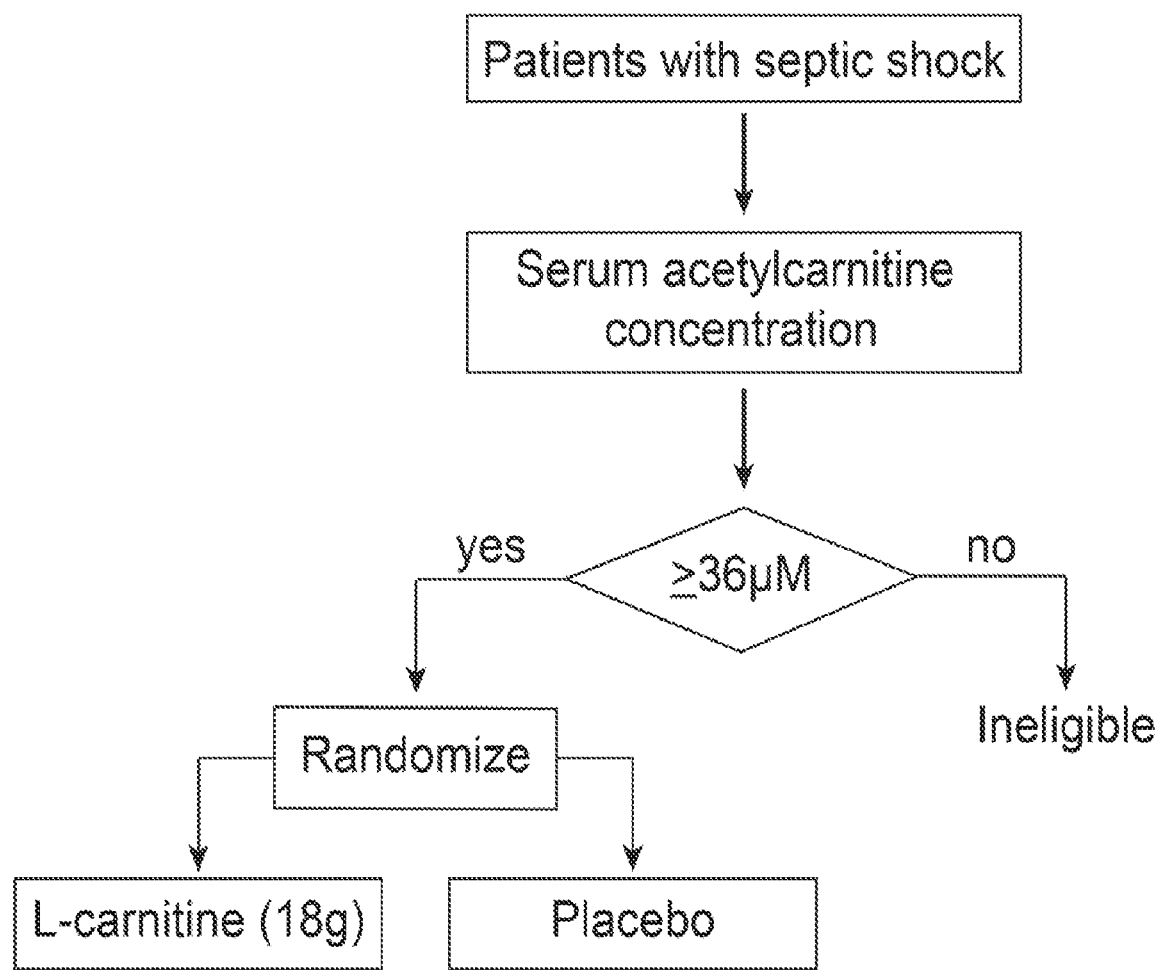
FIG. 2 shows a scheme for a hypothetical phase III clinical trial for the treatment of septic shock with L-carnitine that uses an a priori determined acetylcarnitine threshold concentration (e.g., ≥36 µM) to determine whether a patient is placed in a randomized pool.

*The base model is described as logit(p) = $B_0 + B_D$ * Dose + $B_M$ * Metabolite$_i$ + $B_{SOFA}$ * SOFA + $B_{AGE}$ * Age, where p is the probability of mortality in 90 days
[†]The interaction model is described as logit(p) = $B_0 + B_D$ * Dose + $B_M$ * Metabolite$_i$ + $B_{MD}$ * Metabolite$_i$ * Dose + $B_{SOFA}$ * SOFA + $B_{AGE}$ * Age
[‡]p-values were calculated upon comparison to the appropriate nested model using the likelihood ratio test as described in the supplement methods section; raw p values are not adjusted for multiple comparisons.
[§]as measured by LC-MS
[∥]as measured by $^1$H-NMR As these findings were not evident in the parent clinical trial, it was hypothesized that they might aid in the design of a metabolically informed, precision trial of L-carnitine for the treatment of septic shock using the schema illustrated in FIG. 2. In selecting the candidate metabolites for such a design, all metabolites with significant p values (n=14) were considered in the logistic regression interaction model (Table 4) and assessed the Z-statistic of each. Based on this analysis, the top five metabolites ranked by descending maximum Z-statistic were C12-carnitine, C8:1-carnitine, C10:1-carnitine, C6-carnitine, and acetylcarnitine (Table 6).

TABLE 6

Threshold concentrations of the top 5 metabolites (by maximum Z-statistic) with corresponding percentages (recall) of the RACE study cohort that received L-carnitine (18 g) or placebo with associated Z-statistics and p values

| Threshold (concentration, MM) | Recall (Percent of 18 g or placebo-treated patients) | Z-Statistic | P value |
|---|---|---|---|
| Acetyl-carnitine (C2)* | | | |
| 17 | ~50 | 0.08 | 0.94 |
| 20 | ~40 | 0.94 | 0.35 |
| 26 | ~30 | 1.62 | 0.11 |
| 30 | ~24 | 2.93 | 0.003 |
| 36 | ~20 | 4.47[#] | <0.00001 |
| C12 | | | |
| 0.04 | ~50 | 1.20 | 0.23 |
| 0.05 | ~40 | 1.63 | 0.10 |
| 0.07 | ~30 | 1.49 | 0.14 |
| 0.09 | ~20 | 1.43 | 0.15 |
| 0.18 | ~4 | 5.48[#] | <0.00001 |
| C8:1 | | | |
| 0.47 | ~50 | 1.75 | 0.08 |
| 0.54 | ~40 | 1.82 | 0.07 |
| 0.64 | ~30 | 2.96 | 0.003 |
| 0.78 | ~20 | 3.57 | 0.0004 |
| 0.84 | ~16 | 4.96[#] | <0.00001 |
| C10:1 | | | |
| 0.35 | ~50 | 2.20 | 0.03 |
| 0.43 | ~40 | 3.44 | 0.0006 |
| 0.47 | ~30 | 4.52[#] | <.00001 |
| 0.60 | ~20 | 2.16 | 0.03 |
| C5 | | | |
| 0.18 | ~50 | 1.02 | 0.31 |
| 0.21 | ~40 | 1.55 | 0.12 |
| 0.25 | ~30 | 1.77 | 0.08 |
| 0.28 | ~25 | 4.52[#] | <.00001 |
| 0.30 | ~20 | 3.84 | 0.0001 |

*Acetylcarnitine (C2) concentrations were rounded to the nearest whole number
[#]maximum Z-statistic In considering candidate metabolites, the analysis accounted for C12, C8:1, C10:1, C5 being low abundant acyl-carnitines. Furthermore, the maximum Z-statistic of C12 and C8:1 represented a lower percentage of the clinical cohort than either C12 or acetylcarnitine. Finally, given the known potential of acetylcarnitine to predict drug responsiveness (11) and its close metabolic relationship with L-carnitine, acetylcarnitine was selected as the most viable metabolite candidate and the utility of its concentration was tested to predict the therapeutic response to L-carnitine treatment. For this example, the acetylcarnitine concentration was used at the maximum Z-statistic (36 μM, as measured by LC-MS) (FIGS. 3, scenario 4; also see Table 6) as the threshold concentration.

To illustrate the potential impact the use of this threshold acetylcarnitine concentration might have had in the parent trial, patients were dichotomized as either "high" (≥36 µM) or "low" (<36 µM) acetylcarnitine (Table 7).

TABLE 7

Demographics and clinical characteristics of patients having "low" (<36 µM) versus "high" (≥36 µM) serum acetylcarnitine concentration

| Variable | Low (<36 µM) acetyl carnitine (n = 188) | High (≥36 µM) acetylcarnitine (n = 48) | p-value |
|---|---|---|---|
| Demographics | | | |
| Age, years (IQR) | 63 (54, 71) | 63 (54, 70) | 0.83 |
| Male, n (%) | 108 (57) | 26 (54) | 0.86 |
| Female, n (%) | 80 (43) | 22 (46) | |
| Race | | | |
| Black, n (%) | 60 (32) | 12 (25) | 0.55 |
| Asian, n (%) | 4 (2) | 1 (2) | |
| White, n (%) | 109 (58) | 33 (69) | |
| Other, n (%) | 15 (8) | 2 (4) | |
| Ethnicity | | | |
| Hispanic, n (%) | 11 (6) | 1 (2) | 0.29 |
| Past medical history | | | |
| Diabetes, n (%) | 62 (33) | 18 (38) | 0.55 |
| Liver disease, n (%) | 23 (12) | 13 (27) | 0.01 |
| Renal disease, n (%) | 26 (14) | 8 (17) | 0.62 |
| Physiologic variables | | | |
| Heart rate, beats per minute (IQR) | 100 (86, 115) | 98 (77, 110) | 0.15 |
| Respiratory rate, breaths per minute (IQR) | 20 (16, 25) | 20 (17, 24) | 0.64 |
| Cumulative vasopressor index (IQR) | 4 (4, 8) | 4 (4, 8) | 0.92 |
| Body mass index (IQR) | 27 (23, 34) | 29 (22, 36) | 0.73 |
| Laboratory values | | | |
| White blood count, cells/mm$^3$ (IQR) | 16.5 (10.9, 26.6) | 20.0 (14.3, 27.4) | 0.40 |
| Platelet count, cells/mm$^3$ (IQR) | 150 (83, 222) | 111 (73, 202) | 0.13 |
| Creatinine, mg/dL (IQR) | 1.8 (1.1, 2.5) | 2.7 (1.8, 3.9) | <0.001 |
| Total Bilirubin, mg/dL (IQR) | 0.9 (0.5, 2.0) | 1.5 (0.9, 5.7) | <0.001 |
| Lactate, mmol/L (IQR) | 3.5 (2.4, 6.1) | 5.4 (3.0, 8.7) | <0.01 |
| Severity of Illness | | | |
| SOFA score | 11 (8, 13) | 14 (10, 16) | <0.01 |

Among patients with a "high" pretreatment acetylcarnitine concentration, 90-day mortality would have been lower in those treated with L-carnitine (any dose) versus placebo (69% vs 100%, p=0.02). These findings were most robust in the subgroup of patients treated with the most efficacious 18 g dose of L-carnitine (50% vs 100%, p=0.002).

To illustrate the relationship between baseline (pre-treatment) acetylcarnitine concentration and L-carnitine treatment dose (0, 6, 12, or 18 g), the interaction regression model was used and the probability of 90-day mortality was plotted (FIG. 4). These data indicated that as baseline acetylcarnitine concentration increases, the risk of death at 90 days increases faster in patients who received placebo, 6, or 12 g of carnitine treatment compared with those that received the 18-g dose. Accordingly, the data indicated that higher pretreatment acetylcarnitine concentrations predict a worse prognosis in patients treated with placebo or lower doses of L-carnitine supplementation as compared to the highest tested dose (18 g). This may contribute to the absence of a difference between survivors and non-survivors that received the 12 or 18 g dose of carnitine in the univariate analysis (FIG. 1A).

Further, during the development of embodiments of the technology provided herein, experiments and data analysis were conducted to assess use of acetylcarnitine (C2) concentrations to identify a patient class that would benefit from L-carnitine (18 g) treatment (see, e.g., Jones (2018) "Effect of Levocarnitine vs Placebo as an Adjunctive Treatment for Septic Shock: The Rapid Administration of Carnitine in Sepsis (RACE) Randomized Clinical Trial" JAMA Netw Open 1(8): e186076, incorporated herein by reference).

Data collected from these experiments indicated that an acetylcarnitine (C2) concentration of ≥26 µM predicts a positive patient response to treatment with L-carnitine. In particular, analysis of the data, and the associated Z-statistic and p-values (see, e.g., Table 6), identified a trend in the statistical significance of the predictive power of using patient pre-treatment acetylcarnitine (C2) concentration to predict patient response to treatment with L-carnitine (18 g). See FIG. 3.

Figure 3:
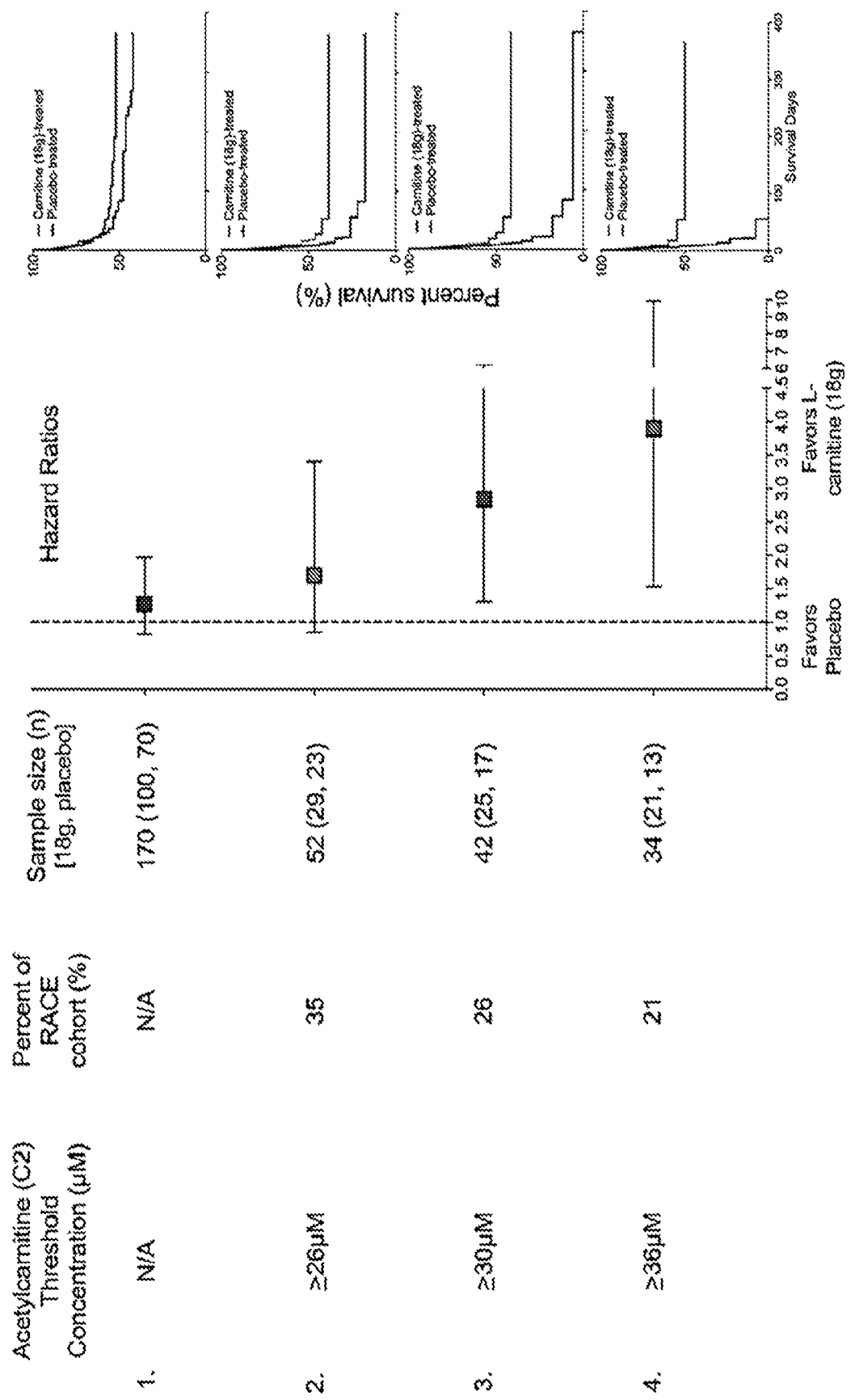
FIG. 3 shows four scenarios of the use of different pre-treatment serum acetylcarnitine concentrations. In scenario 1, no threshold concentration is used so no specific percent of the cohort from Jones (2018) "Effect of Levocarnitine vs Placebo as an Adjunctive Treatment for Septic Shock: The Rapid Administration of Carnitine in Sepsis (RACE) Randomized Clinical Trial." JAMA Netw Open 2018, 1(8): e186076, incorporated herein by reference, clinical trial cohort (n=236) is represented. The sample size of 170 patients represents those that received either L-carnitine (18 g; n=100) or placebo (n=70). The hazard ratio is not significant, and, consistent with the parent trial, the Kaplan-Meier curve shows no mortality benefit of L-carnitine (p=0.28).

Four scenarios were analyzed using data collected from these experiments. In scenario 1, acetylcarnitine (C2) concentration is not used to identify a patient class for treatment (FIG. 3). Accordingly, no percent of the RACE cohort (n=236) is indicated in the appropriate column. The sample size of 170 patients represents patients that received either L-carnitine (18 g; n=100) or placebo (n=70). The hazard ratio is not significant, and, consistent with the parent trial, the Kaplan-Meier curve shows no mortality benefit of L-carnitine (p=0.28) (FIG. 3).

In scenario 2, an acetylcarnitine (C2) threshold concentration of >26 µM was used to identify a patient class for treatment (FIG. 3). Thirty-five percent (n=83) of the RACE cohort met this criterion and 52 patients of the identified patient class received either L-carnitine (18 g) or placebo. The hazard ratio is improved but is not significant, and the Kaplan-Meier curve shows no mortality benefit of L-carnitine (p=0.14) (FIG. 3).

In scenario 3, an acetylcarnitine (C2) threshold concentration of >30 µM was used to identify a patient class for treatment (FIG. 2). Twenty-six percent (n=61) of the RACE cohort met this criterion and 42 patients of the identified patient class received either L-carnitine (18 g) or placebo. The hazard ratio is significant and favors L-carnitine (18 g); the Kaplan-Meier curve shows a mortality benefit of L-carnitine (p=0.01) (FIG. 3).

Finally, in scenario 4, an acetylcarnitine (C2) threshold of >36 µM was used to identify a patient class for treatment (FIG. 10A and FIG. 10B). This concentration was associated with the maximum Z-statistic (see Table 6). Twenty-one percent (n=50) of the RACE cohort met this criterion and 34 patients of the identified patient class received either L-carnitine (18 g) or placebo. The hazard ratio is significant, and the Kaplan-Meier curve shows a mortality benefit of L-carnitine (p=0.004) (FIG. 3). In FIG. 3, Kaplan-Meier curves were interpreted using log-rank (Mantel-Cox) tests; hazard ratios were calculated using Mantel-Haenszel. The statistical analysis considered the sample size of the study, which may have introduced variability around the point at which the acetylcarnitine concentration became statistically significant.

This trend indicated that ≥26 µM acetylcarnitine (C2) was the threshold pre-treatment patient concentration of acetylcarnitine (C2) at which patients derived a mortality benefit from L-carnitine treatment (18 g). See, e.g., FIG. 3. In addition, these data also provide a useful clinical trial patient enrichment strategy in which patients are selected for a clinical trial based on a having a pre-treatment patient acetylcarnitine (C2) concentration of at least 26 µM.

REFERENCES

Cited by Number in Parentheses

1. Fleischmann et al. International Forum of Acute Care T. Assessment of Global Incidence and Mortality of Hospital-treated Sepsis. Current Estimates and Limitations. Am J Respir Crit Care Med 2016; 193: 259-272.
2. Gaieski et al. Benchmarking the incidence and mortality of severe sepsis in the United States. Crit Care Med 2013; 41: 1167-1174.
3. Rudd et al. Global, regional, and national sepsis incidence and mortality, 1990-2017: analysis for the Global Burden of Disease Study. Lancet 2020; 395: 200-211.
4. Langley et al. Integrative "omic" analysis of experimental bacteremia identifies a metabolic signature that distinguishes human sepsis from systemic inflammatory response syndromes. Am J Respir Crit Care Med 2014; 190: 445-455.
5. Singer et al. The Third International Consensus Definitions for Sepsis and Septic Shock (Sepsis-3). JAMA 2016; 315: 801-810.
6. Liu et al. Nuclear magnetic resonance-based serum metabolomic analysis reveals different disease evolution profiles between septic shock survivors and non-survivors. Crit Care 2019; 23: 169.
7. Seymour et al. Derivation, Validation, and Potential Treatment Implications of Novel Clinical Phenotypes for Sepsis. JAMA 2019; 321: 2003-2017.
8. Jones et al. Effect of Levocarnitine vs Placebo as an Adjunctive Treatment for Septic Shock: The Rapid Administration of Carnitine in Sepsis (RACE) Randomized Clinical Trial. JAMA Netw Open 2018; 1: e186076.
9. Johansson et al. Plasma mitochondrial DNA and metabolomic alterations in severe critical illness. Crit Care 2018; 22: 360.
10. Mickiewicz et al. Metabolic profiling of serum samples by 1H nuclear magnetic resonance spectroscopy as a potential diagnostic approach for septic shock. Crit Care Med 2014; 42: 1140-1149.
11. Puskarich et al. Pharmacometabolomics of 1-carnitine treatment response phenotypes in patients with septic shock. Ann Am Thorac Soc 2015; 12: 46-56.
12. Puskarich et al. Septic Shock Nonsurvivors Have Persistently Elevated Acylcarnitines Following Carnitine Supplementation. Shock 2018; 49: 412-419.
13. Labaki et al. Serum amino acid concentrations and clinical outcomes in smokers: SPIROMICS metabolomics study. Sci Rep 2019; 9: 11367.
14. McHugh et al. Rapid, Reproducible, Quantifiable NMR Metabolomics: Methanol and Methanol: Chloroform Precipitation for Removal of Macromolecules in Serum and Whole Blood. Metabolites 2018; 8.
15. Puskarich et al. Preliminary safety and efficacy of L-carnitine infusion for the treatment of vasopressor-dependent septic shock: a randomized control trial. JPEN J Parenter Enteral Nutr 2014; 38: 736-743.
16. Langley et al. An integrated clinico-metabolomic model improves prediction of death in sepsis. Sci Transl Med 2013; 5: 195ra195.
17. Chung et al. Increased Plasma Acetylcarnitine in Sepsis Is Associated With Multiple Organ Dysfunction and Mortality: A Multicenter Cohort Study. Crit Care Med 2019; 47: 210-218.
18. Martin et al. The effect of age on the development and outcome of adult sepsis. Crit Care Med 2006; 34: 15-21.
19. Vincent et al. Use of the SOFA score to assess the incidence of organ dysfunction/failure in intensive care units: results of a multicenter, prospective study. Working group on "sepsis-related problems" of the European Society of Intensive Care Medicine. Crit Care Med 1998; 26: 1793-1800.
20. Vincent & Sakr. Clinical trial design for unmet clinical needs: a spotlight on sepsis. Expert Rev Clin Pharmacol 2019; 12: 893-900.
21. Costa et al. Dynamic changes of plasma acylcarnitine levels induced by fasting and sunflower oil challenge test in children. Pediatr Res 1999; 46: 440-444.
22. Annane et al. Norepinephrine plus dobutamine versus epinephrine alone for management of septic shock: a randomised trial. Lancet 2007; 370: 676-684.
23. Levy et al. Relation between muscle Na+K+ ATPase activity and raised lactate concentrations in septic shock: a prospective study. Lancet 2005; 365: 871-875.
24. Puskarich et al. Lactate Clearance in Septic Shock Is Not a Surrogate for Improved Microcirculatory Flow. Acad Emerg Med 2016; 23: 690-693.
25. Arnold et al. Multicenter study of early lactate clearance as a determinant of survival in patients with presumed sepsis. Shock 2009; 32: 35-39.
26. Jansen et al. Early lactate-guided therapy in intensive care unit patients: a multicenter, open-label, randomized controlled trial. Am J Respir Crit Care Med 2010; 182: 752-761.
27. Muoio et al. Muscle-specific deletion of carnitine acetyltransferase compromises glucose tolerance and metabolic flexibility. Cell Metab 2012; 15: 764-777.
28. Schroeder et al. The cycling of acetyl-coenzyme A through acetylcarnitine buffers cardiac substrate supply: a hyperpolarized 13C magnetic resonance study. Circ Cardiovasc Imaging 2012; 5: 201-209.
29. Evans et al. Untargeted Metabolomics Differentiates 1-Carnitine Treated Septic Shock 1-Year Survivors and Nonsurvivors. J Proteome Res 2019; 18: 2004-2011.
30. Storey. A direct approach to false discovery rates. J Roy Stat Soc B 2002; 64: 479-498.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:
1. A method of treating a subject for sepsis, said method comprising:
   measuring an acetylcarnitine level in a biological sample from a subject that is greater than or equal to a threshold level of 26 µM; and
   administering carnitine to said subject.

2. The method of claim 1 wherein said biological sample comprises a serum sample.

3. The method of claim 1 wherein said carnitine is administered in a dose of 18 g.

4. The method of claim 1 comprising testing said subject for a symptom of sepsis.

5. The method of claim 1 wherein said subject has a decreased 90-day mortality after treatment with carnitine.

6. The method of claim 1, further comprising measuring C12-carnitine, C8:1-carnitine, C10:1-carnitine, and/or C5-carnitine.

7. The method of claim 1 further comprising measuring a second acetylcarnitine level in a biological sample from a subject after said administering carnitine to said subject.

8. The method of claim 7 further comprising administering carnitine to said subject after measuring said second acetylcarnitine level.

\* \* \* \* \*